(12) United States Patent
Engle et al.

(10) Patent No.: US 7,005,162 B2
(45) Date of Patent: Feb. 28, 2006

(54) METHODS OF FIXING INK

(75) Inventors: Lori P. Engle, Little Canada, MN (US); David W. Tweeten, Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 119 days.

(21) Appl. No.: 10/865,413

(22) Filed: Jun. 10, 2004

(65) Prior Publication Data

US 2004/0223039 A1 Nov. 11, 2004

Related U.S. Application Data

(60) Division of application No. 09/778,475, filed on Feb. 7, 2001, now Pat. No. 6,764,725, which is a continuation-in-part of application No. 09/500,153, filed on Feb. 8, 2000, now abandoned.

(51) Int. Cl.
*B41M 5/00* (2006.01)

(52) U.S. Cl. ............... 427/265; 156/235; 427/152; 427/258; 427/261; 427/379; 428/32.1; 428/32.29; 428/32.3; 347/105

(58) Field of Classification Search ............. 156/235; 427/152, 258, 261, 265, 379; 428/32.1, 32.12, 428/32.29, 32.3; 347/105
See application file for complete search history.

(56) References Cited

U.S. PATENT DOCUMENTS

| | | | |
|---|---|---|---|
| 3,957,724 A | 5/1976 | Schurb et al. |
| 3,997,702 A | 12/1976 | Schurb et al. |
| 4,313,988 A | 2/1982 | Koshar et al. |
| 4,567,073 A | 1/1986 | Larson et al. |
| 4,595,931 A | 6/1986 | Toganoh et al. |
| 4,605,592 A | 8/1986 | Paquette et al. |
| 4,614,667 A | 9/1986 | Larson et al. |
| 4,775,594 A | 10/1988 | Desjarlais |
| 4,904,519 A | 2/1990 | Newman |
| 4,935,307 A | 6/1990 | Iqbal et al. |
| 4,956,230 A | 9/1990 | Edwards et al. |
| 4,957,943 A | 9/1990 | McAllister et al. |
| 5,045,386 A | 9/1991 | Stan et al. |
| 5,126,195 A | 6/1992 | Light |
| 5,130,342 A | 7/1992 | McAllister et al. |
| 5,134,198 A | 7/1992 | Stofko, Jr. et al. |
| 5,141,790 A | 8/1992 | Calhoun et al. |
| 5,192,617 A | 3/1993 | Stofko, Jr. et al. |
| 5,198,306 A | 3/1993 | Kruse |
| 5,202,190 A | 4/1993 | Kantner et al. |
| 5,208,092 A | 5/1993 | Iqbal |
| 5,219,928 A | 6/1993 | Stofko, Jr. et al. |
| 5,229,207 A | 7/1993 | Paquette et al. |
| 5,241,006 A | 8/1993 | Iqbal et al. |
| 5,290,615 A | 3/1994 | Tushaus et al. |
| 5,302,436 A | 4/1994 | Miller |
| 5,310,591 A | 5/1994 | Dodge et al. |
| 5,310,595 A | 5/1994 | Ali et al. |
| 5,342,688 A | 8/1994 | Kitchin et al. |
| 5,352,736 A | 10/1994 | Stofko, Jr. et al. |
| 5,354,813 A | 10/1994 | Farooq et al. |

(Continued)

FOREIGN PATENT DOCUMENTS

| | | |
|---|---|---|
| EP | 0 459 501 A1 | 12/1991 |
| EP | 0 461 796 A1 | 12/1991 |
| EP | 0 570 515 B1 | 11/1993 |

(Continued)

*Primary Examiner*—B. Hamilton Hess

(57) ABSTRACT

The invention provides methods for providing improved image quality and water resistance of dye based ink images on substrates using aqueous dispersed mordants and dispersed hydrophobic materials.

21 Claims, 16 Drawing Sheets

(14 of 16 Drawing Sheet(s) Filed in Color)

U.S. PATENT DOCUMENTS

| | | |
|---|---|---|
| 5,376,727 A | 12/1994 | Iqbal et al. |
| 5,389,723 A | 2/1995 | Iqbal et al. |
| 5,403,955 A | 4/1995 | Farooq |
| 5,445,866 A | 8/1995 | Martinson et al. |
| 5,464,900 A | 11/1995 | Stofko, Jr. et al. |
| 5,472,789 A | 12/1995 | Iqbal et al. |
| 5,518,809 A | 5/1996 | Henry et al. |
| 5,565,518 A | 10/1996 | Stofko, Jr. et al. |
| 5,567,507 A | 10/1996 | Paff et al. |
| 5,589,269 A | 12/1996 | Ali et al. |
| 5,658,802 A | 8/1997 | Hayes et al. |
| 5,667,674 A | 9/1997 | Hanggi et al. |
| 5,686,602 A | 11/1997 | Farooq et al. |
| 5,688,603 A | 11/1997 | Iqbal et al. |
| 5,707,722 A | 1/1998 | Iqbal et al. |
| 5,712,027 A | 1/1998 | Ali et al. |
| 5,721,086 A | 2/1998 | Emslander et al. |
| 5,747,148 A | 5/1998 | Warner et al. |
| 5,760,126 A | 6/1998 | Engle et al. |
| 5,766,398 A | 6/1998 | Cahili et al. |
| 5,795,425 A | 8/1998 | Brault et al. |
| 5,837,375 A | 11/1998 | Brault et al. |
| 5,876,595 A | 3/1999 | Hanggi et al. |
| 5,932,355 A | 8/1999 | Iqbal et al. |
| 5,968,652 A | 10/1999 | Hanggi et al. |
| 5,969,069 A | 10/1999 | Su et al. |
| 5,989,685 A | 11/1999 | Hockaday |
| 6,001,482 A | 12/1999 | Anderson et al. |
| 6,020,058 A | 2/2000 | Pekala et al. |
| 6,036,808 A | 3/2000 | Shaw-Klein et al. |
| 6,080,261 A | 6/2000 | Popat et al. |
| 6,087,051 A | 7/2000 | Shoji et al. |
| 6,096,469 A | 8/2000 | Anderson et al. |
| 6,124,417 A | 9/2000 | Su |
| 6,153,038 A | 11/2000 | Brooker |
| 6,156,400 A | 12/2000 | Jing et al. |
| 6,165,593 A | 12/2000 | Brault et al. |
| 2002/0052439 A1 | 5/2002 | Farooq |
| 2003/0168156 A1 | 9/2003 | Engle et al. |

FOREIGN PATENT DOCUMENTS

| | | |
|---|---|---|
| EP | 0 972 651 A1 | 1/2000 |
| WO | WO 95/06564 | 3/1995 |
| WO | WO 96/26074 | 8/1996 |
| WO | WO 96/26840 | 9/1996 |
| WO | WO 97/07991 | 3/1997 |
| WO | WO 97/18950 | 5/1997 |
| WO | WO 97/33752 | 9/1997 |
| WO | WO 97/33758 | 9/1997 |
| WO | WO 99/03929 | 1/1999 |
| WO | WO 99/07558 | 2/1999 |
| WO | WO 99/16419 | 4/1999 |
| WO | WO 99/22274 | 5/1999 |
| WO | WO 99/39914 | 8/1999 |
| WO | WO 99/42296 | 8/1999 |
| WO | WO 99/55537 | 11/1999 |
| WO | WO 99/56179 | 11/1999 |
| WO | WO 99/56682 | 11/1999 |
| WO | WO 99/65701 | 12/1999 |
| WO | WO 99/65702 | 12/1999 |
| WO | WO 99/65703 | 12/1999 |
| WO | WO 00/01536 | 1/2000 |
| WO | WO 00/02735 | 1/2000 |
| WO | WO 00/47421 | 8/2000 |
| WO | WO 00/68301 | 11/2000 |
| WO | WO 00/71360 | 11/2000 |
| WO | WO 00/73082 | 12/2000 |
| WO | WO 00/73083 A1 | 12/2000 | ion Ser. No. 09/778,475, filed Feb. 7, 2001, now U.S. Pat. No. 6,764,725; which is a continuation-in-part of U.S. application Ser. No. 09/500,153, filed Feb. 8, 2000, now abandoned.

METHODS OF FIXING INK

CROSS-REFERENCE TO RELATED APPLICATIONS

This application is a divisional of U.S. application Ser. No. 09/778,475, filed Feb. 7, 2001, now U.S. Pat. No. 6,764,725; which is a continuation-in-part of U.S. application Ser. No. 09/500,153, filed Feb. 8, 2000, now abandoned.

FIELD OF THE INVENTION

The present invention relates to ink fixing materials and methods for fixing dye based inks to solid and porous substrates, for example, walls and fabrics.

BACKGROUND OF THE INVENTION

Direct inkjet printing onto a variety of substrates such as films, papers, and fabrics has been used to generate graphic images. However, for substrates that are either of poor dimensional stability (such as many fabrics), or that are too large to be handled using a conventional inkjet printer (for example, a wall of a room), indirect printing methods such as transfer printing methods are normally employed. Current inkjet transfer printing methods include printing onto fabrics that have adhesive backings adhering them to a release liner, or iron-on transfers.

Inkjet printing has been used to provide images on a wide variety of substrates including films, papers, fabrics, and the like. Commercially available inks for ink-jet printers are typically aqueous based and employ dyes as colorants. Current commercially available inks generally lack the simultaneous properties of good image quality (e.g., high resolution and color density) and waterfastness or washfastness when printed on any of the above-mentioned substrates. This is important if the image is transferred to a surface that will encounter water or be washed in normal usage (for example, clothing, room walls, etc.).

Whether inkjet printing is performed in an industrial process or on a printer attached to a personal computer, there exists a need to be able to print an image on a wide variety of substrates that have the simultaneous properties of good image quality and waterfastness or even washfastness.

SUMMARY OF THE INVENTION

The present invention provides compositions and processes useful for improving image quality and water resistance of dye based ink images, particularly dye based inks used in inkjet printing. The compositions and processes are easy to use and suitable for office and home use environments.

In one aspect, the invention provides a method for providing a durable ink image on a substrate. The method comprises the steps of coating a surface of the substrate with an aqueous mordant dispersion; printing or transferring a selected image onto the coated surface; optionally drying the image; applying a dispersed hydrophobic material onto the imaged surface; and drying the dispersed hydrophobic material. The method may optionally further include the step of heating the transferred and fixed image. The method may also optionally include the step of drying the coated mordant dispersion before printing or transferring the image.

In another aspect, the invention provides another method for providing a durable ink image on a substrate. The method comprises the steps of coating a surface of the substrate with an ink fixing mixture comprising an aqueous dispersion of a mordant and a dispersed hydrophobic material; printing or transferring a selected image onto the coated substrate; and drying the image and coated ink fixing mixture. The method may further include the step of heating the transferred and fixed image.

In another aspect, the invention provides a method for providing a durable ink image on a non-porous substrate. The method comprises the steps of coating a surface of a non-porous substrate with an aqueous fluoropolymer dispersion, printing or transferring an image onto the coated non-porous substrate; and heating the coated image. The method may also optionally include drying the coated fluoropolymer dispersion at ambient temperature prior to printing or transferring the image.

In still another aspect, image bearing articles are provided that are prepared by any of the preceding methods.

In still an another aspect, the invention provides a kit for providing a durable image on a substrate. The kit comprises an image transfer medium, aqueous mordant dispersion, and hydrophobic material dispersion. The mordant dispersion and hydrophobic material dispersions may be supplied separately or as a mixture of the two.

A feature of the invention is that it provides materials and means whereby aqueous inkjet inks may be printed with high resolution and good color density, and having improved waterfastness and washfastness compared to prior methods.

The term "mordant" means a compound which, when present in a composition, interacts with a dye to prevent diffusion through the composition.

A "non-porous substrate" is a substrate that is not porous to ink.

As used herein, the term "dry" refers to dry to the touch; that is, does not transfer to a finger when touched.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
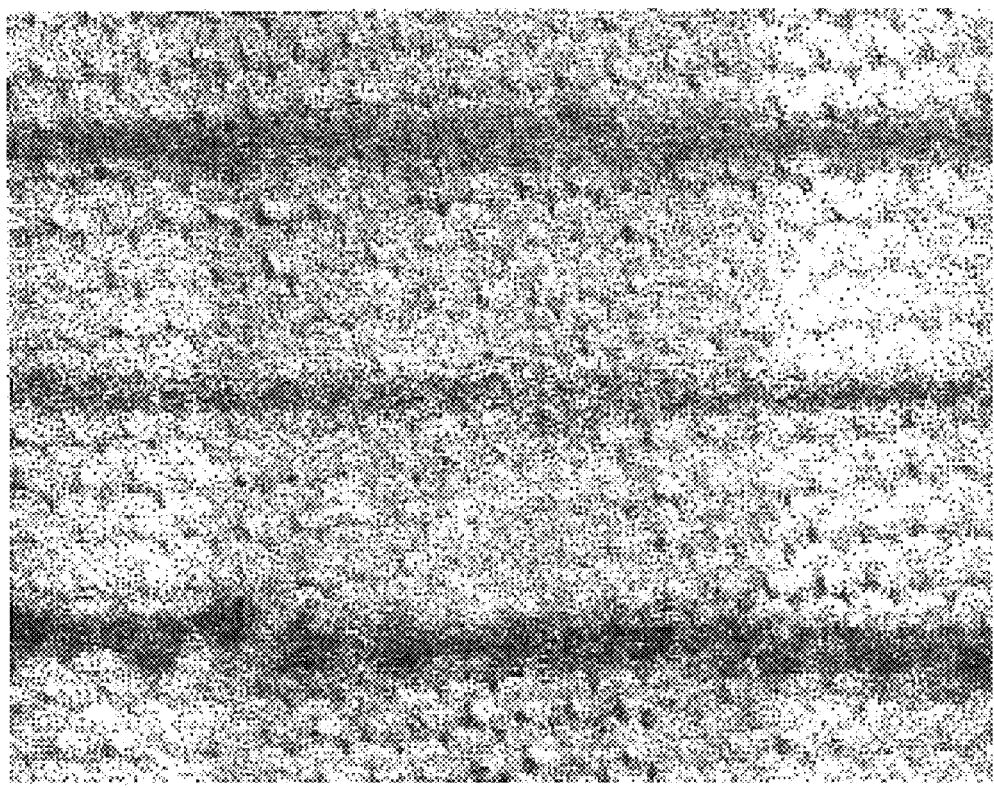
FIGS. 1–14 are magnified digital images of images prepared using examples of the invention and comparative examples.

The invention in its various aspects employs two essential components: a mordant, and a dispersed hydrophobic material. The mordant functions to improve wettability of the substrate, and improves image quality by helping to fix the image. The dispersed hydrophobic material serves to provide a degree of durability and water resistance and washfastness to the printed image.

Suitable mordants are readily dispersible or soluble in water and include polymeric dye mordants which may be cationic or neutral, inorganic metal ion containing colloids, and polymer bound metal ion containing colloids.

Polymeric dye mordants include those known in the art for use with dye based inks, for example, quaternary ammonium groups containing polymers such as poly(ethyleneiminium) chloride; poly(vinylpyridinium) chloride; poly(N,N-diallyldimethylammonium) bromide; poly(ethyleniminium) chloride; copolymers having quaternary ammonium groups such as those disclosed in U.S. Pat. No.

5,712,027 (Ali), U.S. Pat. No. 5,354,813 (Farooq), and U.S. Pat. No. 5,342,688 (Kitchin), all incorporated by reference herein; epichlorohydrin/aminopolymer resins (for example "KYMENE 557H", commercially available from Hercules, Inc. of Wilmington, Del.); poly(ethylenimine); polyaziridine condensation products; homopolymers and copolymers of N-vinylpyrrolidone, for example, copolymers of N-vinylpyrrolidone and dimethylaminoethyl methacrylate; copolymers of N-vinylpyrrolidone and methylvinylimidazolium salts; homopolymers and copolymers of acrylamide; homopolymers and copolymers of N,N-dimethylacrylamide; homopolymers and copolymers of N,N-diallylmethylamine; and condensates of aminoalkylsilanes, such as 3-aminopropyltriethoxysilane, N,N-diethyl-3-aminopropyltriethoxysilane, etc.

Non-limiting examples of inorganic metal ion containing colloids include inorganic sols such as alumina colloids, silica colloids, aluminosilicate colloids; and surface treated silica and alumina colloids that have been surface treated with, for example, alumina, or an organosilane (such as aminopropyltriethoxysilane, etc.).

Non-limiting examples of polymer bound metal ion containing colloids include aluminum salts of organic polymers such as hydroxypropyl methylcellulose crosslinked with aluminum ions as described in U.S. Pat. No. 5,686,602, incorporated by reference herein.

The mordant is applied to the substrate as a 1–50 weight percent solution, preferably 15–30 weight percent solution in water, and then optionally dried prior to imaging.

Dispersed hydrophobic materials serve to provide an aqueous source of hydrophobic materials that may be applied to printed images to enhance their waterfastness and washfastness. While dispersed (e.g., emulsified), the hydrophobic materials are not effective protective agents (not hydrophobic), but upon drying, these materials often become hydrophobic. Thus, it is possible to print directly onto substrates treated with hydrophobic materials using aqueous inks so long as the hydrophobic materials have not yet become hydrophobic. "Hydrophobic" as used herein means that the surface of the material is not readily wetted by water. However, once the emulsions are hydrophobic (for example, by heating after air drying) the printing process is generally difficult to carry out successfully with aqueous inks. Any hydrophobic material known in the art that can be dispersed may be used in practice of the invention. Preferred dispersed hydrophobic materials are fluorinated organic compounds, silicones, polyvinyls, polyesters, and polyurethanes. Fluorinated organic compounds are most preferred as hydrophobic materials.

Fluorinated organic compounds useful in practice of the present invention include aqueous fluoropolymer dispersions that, when dried, form a surface that is repellent to water. Importantly, fluorinated surfactants, by their nature, generally do not provide such repellency. Examples of fluoropolymer dispersions that are useful in practice of the invention include those sold under the FLUORAD trade designation by Minnesota Mining and Manufacturing Company of St. Paul, Minn., such as FLUORAD FC-359 (an aqueous dispersion of a fluoroalkyl polymer (approximately 20 percent)), FLUORAD FC-461 (an aqueous dispersion of a fluoroalkyl copolymer (approximately 27 percent), FLUORAD FC-1355 (an aqueous dispersion of a fluoroalkyl polymer (approximately 15 percent)), FLUORAD FC-405 (a fluoroaliphatic silyl ether approximately 62 percent, ethanol approximately 37 percent, 2-butanone approximately 1 percent) and FLUORAD FC-280 (an aqueous dispersion of a fluoroalkyl polymer (approximately 30 percent)).

Non-limiting examples of useful silicones include polysiloxane polymers (such as poly(dimethylsiloxane), poly (methylphenylsiloxane), etc.) and alkoxylated derivatives therefrom such as those described in U.S. Pat. No. 5,932,355, incorporated by reference herein, for the description of alkoxylated derivatives of polysiloxane polymers; hydrolyzable or otherwise condensable silanes such as cyclosiloxanes (e.g., octamethylcyclotetrasiloxane, decamethylcyclopentasiloxane, etc.); alkoxysiloxanes (e.g., octyltriethoxysilane, octadecyltriethoxysilane, octyltrimethoxysilane), acyloxysilanes, hydrosilanes, and the like.

Non-limiting examples of useful polyvinyls include poly (meth)acrylates (i.e., polymerized ethylenically unsaturated monomers) such as hydrocarbyl ester (meth)acrylate polymers (for example, polymers and copolymers of butyl acrylate, hexyl acrylate, octyl(meth)acrylate, ethyl(meth) acrylate, propyl acrylate, etc.); copolymers of ethylene and vinyl acetate, vinyl chloride, etc.; homopolymers and copolymers of acrylonitrile; homopolymers and copolymers of styrene.

When additional washfastness is desired, it is possible to incorporate a co-monomer having a thermosettable group such as methylol acrylamide co-monomer into the polyvinyl copolymers. Many such materials are available under the RHOPLEX trade designation from Rohm & Haas Co. of Philadelphia, Pa.

Dispersed hydrophobic materials are typically applied as aqueous solutions having from 1–50 weight percent solids, or even higher. When used alone, the hydrophobic materials are preferably 5–40 weight percent solids, more preferably 10–30 weight percent solids dispersions. When combined with the mordant and applied as a single dispersion, the dispersed hydrophobic materials are preferably present at 5–30 weight percent solids.

Method of Making the Invention

The mordants and dispersed hydrophobic materials may be employed individually or easily mixed and used as a single dispersion. When mixed, reasonable care should be taken to avoid an incompatible mixture, as stability for a period of weeks to years is generally desirable.

While the solids content of the mordant solution or dispersion and the dispersed hydrophobic materials components is typically in the ranges listed above, it may also be important to control the coating weight (i.e., add on) of the coating applied to the substrate. In some embodiments of the invention, the mordant is applied in an amount sufficient to wet the substrate to allow for rapid ink sorption and then printed directly on the damp substrate.

For typical porous substrates (e.g., fabrics) a wet add on for the mordant is from about 0.1 part up to about 20 parts wet add on per 10 parts fabric by weight, preferably from about 0.5 part up to about 15 parts wet add on per 10 parts fabric by weight. For hard non-porous substrates typical wet add on for the mordant ranges from about 5 grams per square meter up to about 500 grams per square meter, preferably from about 10 grams per square meter up to about 100 grams per square meter, more preferably from about 30 grams per square meter up to about 70 grams per square meter. On the other hand, in some embodiments with particularly absorbent substrates, it may be advantageous to dry the mordant. This is because the substrates would contain excess water which would decrease the effectiveness of the mordant.

Method of Using the Compositions

The compositions of the invention may be utilized on many types of fabrics of many different constructions, including for example, woven fabrics, knit fabrics, and non-woven fabrics. Examples of fabrics include, but are not limited to, those having fibers made from polyamides such as nylon; polyesters such as DACRON; polyolefins such as polypropylene, polyethylene, etc.; cotton; linen; wool; and rayon.

In one embodiment, an image is printed or transferred and fixed on fabric. In a first step, the mordant dispersion is first applied to the cloth covering the area to be imaged, and optionally dried. In a second step, the image is applied to the treated area, and then the image is optionally dried. The image may be dried at ambient or room temperature (typically, 20° C.–25° C.) or heated at a temperature of up to 100° C. to dry the image. In a third step, a dispersed hydrophobic material is applied to the image bearing surface of the substrate, and dried at ambient or room temperature (typically, 20° C.–25° C.) or heated at a temperature of up to 100° C. to dry the image with optional heating to a temperature sufficient to remove residual water and optionally cause chemical crosslinking of the hydrophobic material. Typically, this involves temperatures of up to about 100° C., although in some cases, higher temperatures may be useful depending on the nature of the crosslinking chemistry and the substrate. Drying time of the hydrophobic material ranges from about 2 minutes to 24 hours or more, depending upon the drying temperature.

In another embodiment, the invention provides a method for providing a durable ink image on a substrate, wherein the method comprises the steps of coating a substrate with a mixture of an aqueous mordant and a dispersed hydrophobic material, optionally, drying the coated substrate, printing or transferring a selected image onto the coated surface of the substrate, and an optional further step of heating the substrate.

In another embodiment, the invention provides a method for providing a durable ink image on a non-porous substrate. Examples of non-porous substrates include polymeric films, painted surfaces such as walls, glass, metals, and the like. The method comprises the steps of coating a surface of a non-porous substrate with an aqueous fluoropolymer dispersion, printing or transferring an image onto the coated non-porous substrate, drying, and optionally heating the coated image such that the dispersed fluoropolymer material becomes hydrophobic. The method may also optionally include drying the coated fluoropolymer dispersion at preferably, ambient temperature to 100° C. or more depending on the polymer. Typical drying times range from 2 minutes to 24 hours or more depending upon the drying temperature. However, care should be taken not to dry or to allow the aqueous fluoropolymer dispersion to dry completely to the hydrophobic state prior to applying the image over the coated dispersion. If the coated dispersion becomes hydrophobic, the image will not become fixed onto the substrate or may not even form or be transferred. Thus, prior to image printing or transfer, the hydrophobic material should be dried such that an image can be applied through wetting of the ink.

The various processes of the invention may be carried out with any ink known in the graphic arts. Preferably, the inks used are based aqueous inks, with the greatest benefit observed when dye based aqueous inks are employed. Thus, the invention is particularly well suited for us with commercial inkjet inks such as those available, for example, from Hewlett-Packard Corp. of Palo Alto, Calif., and Lexmark International of Lexington, Ky.

Mordants and dispersed hydrophobic materials used in practice of the invention may be applied to substrates in a wide variety of methods known for coating liquids on substrates. Examples include roll coating, gravure coating, spraying, inkjet printing, bar coating, knife coating, saturation coating methods, sponge coating, and the like.

Mordants and dispersed hydrophobic materials used in practice of the invention may be dried in a wide variety of methods depending on need. Useful techniques include air drying under ambient conditions, drying in a forced air or convection oven, heat gun, infrared lamps, etc.

Images may be applied to substrates according to the various processes of the invention by any means for imaging with liquid inks known in the graphic arts. One preferred method for printing images according to the invention is an indirect transfer process in which the image is printed as a reverse image on an image transfer medium, then transferred to a second substrate by intimately contacting the image transfer medium with the second substrate and applying pressure (e.g., with a hand-held roller, by hand, and the like), and then subsequently removing the image transfer medium.

An "image transfer medium" is any medium which is capable of receiving an image and then transferring an image to another substrate. Useful image transfer media include sheets having a smooth imaging surface and sheets having a micro-embossed imaging surface. A micro-embossed surface has a topography wherein the average micro-embossed element pitch, that is, center to center distance between micro-embossed elements is from about 1 to about 1000 micrometers and average peak to valley distances of individual micro-embossed elements is from about 1 to about 100 micrometers. A "micro-embossed element" means a recognizable geometric shape that either protrudes or is depressed.

Figure 15:
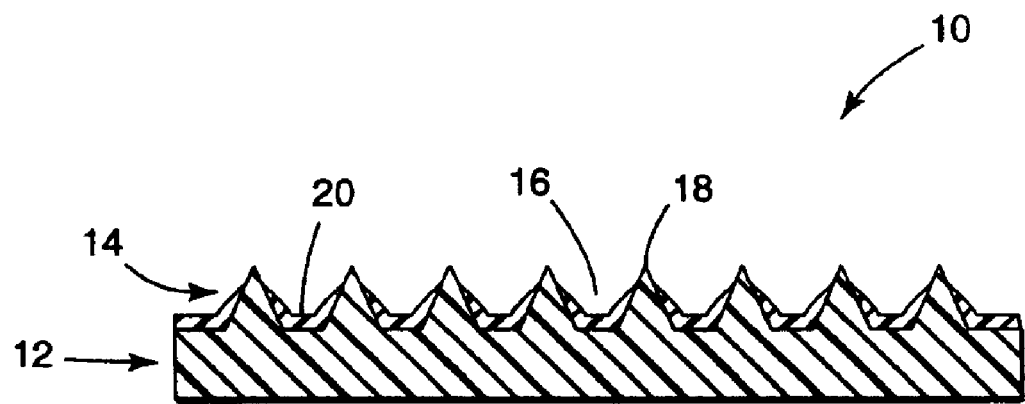
FIGS. 15–18 show magnified illustrative views of useful image transfer media.

FIG. 15 illustrates a preferred embodiment of an image transfer medium 10 that is constructed of a sheet 12 having an imaging surface characterized by a micro-embossed image surface topography 14 of multiple wells or cavities 16 and peaks 18 and having a coating of an ink release material 20. The imaging surface of the sheet is nonporous. "Non-porous" means that the integral imaging surface of the sheet is not substantially porous to liquid inks. "Ink release material" means a material that provides for the release of not only inks but other printed materials as well. The ink release material is used to lower the surface energy of the micro-embossed image surface, which facilitates ink transfer. "Surface energy" as used herein is equal to the surface tension of the highest surface tension liquid (real or imaginary) that will completely wet a solid with a contact angle of 0 degrees, which may be determined by measuring the critical surface tension from static contact angles of pure liquids using the method of W. A. Zisman described in "Relation of Equilibrium Contact Angle to Liquid and Solid Constitution", ACS Advances in Chemistry Series #43, American Chemical Society, 1961, pages 1–51, incorporated by reference herein. The image transfer medium 10 is useful for receiving an ink image and protecting the ink image from abrasion, and then capable of transferring the ink to another substrate. FIG. 15 also illustrates an ink drop 30 within one cavity 16 such that the outermost surfaces or peaks 18 of the micro-embossed topography, on a macroscopic level, control placement of the ink drop 30 before transfer.

Sheet 12 used in the image transfer medium can be made from any polymer or combination of polymers capable of being micro-embossed in the manner of the present invention.

The ink release coating is a coating that resides on the micro-embossed surface. The ink release coating may be continuous or discontinuous and is preferably continuous. The purpose or function of the ink release coating is to lower the surface energy of the micro-embossed surface of the image transfer medium, thereby facilitating a more complete transfer of the ink to a second substrate to form an image of high color density to a second substrate. Without the ink release coating, only portions of the image may transfer or only a top portion of the ink contained in each cavity may transfer to the second substrate, requiring perhaps a second ink image printed and transferred. Thus, useful ink release coatings are those coatings that can be applied or migrate to the micro-embossed surface of the sheet to lower the surface energy of the portions of the cavities which ink will contact such that at least 20 percent, preferably at least 50 percent, even more preferably at least 75 percent of the ink is transferred as measured by reflectance color density.

Preferred ink release coatings include compositions comprising silicones, fluorochemicals, and polymers thereof. Alternatively, additives may be incorporated into polymeric materials used for sheets or surfaces of sheets that migrate to the surface of the image transfer medium and provide a low surface energy coating, that is, ink release coating. These additives may be added to thermoplastic and/or thermoset resins that are extruded and micro-embossed to form image transfer media of the invention. Useful surface energy modifying additives include silicone surfactants such as those available from OSi Specialties, Inc., of Danbury, Conn., under the tradename SLWET, and fluorinated surfactants such as those available under the tradename FLUO-RAD FC-1802, etc., available from Minnesota Mining and Manufacturing Company, St. Paul, Minn.

Preferred ink release coatings provide the micro-embossed surface with a surface energy of about 43 dyne/centimeter or less, preferably about 30 dyne/centimeter or less, more preferably about 25 dyne/centimeter or less. Ink release coating materials that will provide surface energies of 43, 30, and 25 dynes/centimeter or less are commercially available.

In general, the choice of geometrical configuration of the specific micro-embossed features does not greatly influence image transfer performance, so long as there is sufficient micro-embossed capacity to control placement of an individual drop of ink. In some preferred embodiments, the geometrical configuration is chosen such that the micro-embossed element pitch (i.e., center to center distance between micro-embossed elements) is less than about 340 micrometers. In further preferred embodiments, the micro-embossed micro-embossed element density of the pattern is such that the cavity walls actually collapse when moderate pressure is applied by hand to effect the transfer of the image.

For example, low density polyethylene walls micro-embossed as an orthogonal grid and having an average wall thickness of 10–25 micrometers, spaced with a micro-embossed element pitch of 338 micrometers, and having square cavities with a depth of 25 micrometers, completely collapse during image transfer with moderate hand pressure. On the other hand, the same low density polyethylene material micro-embossed with an orthogonal grid pattern with walls 10–25 micrometers thick, spaced with a micro-embossed element pitch of 127 micrometers, and having square cavities with a depth of 25 micrometers do not collapse.

In general, the amount of ink transferred from films with collapsible features is superior to those films containing more rigid features. Silicone rubber micro-embossed elements are preferred, since they collapse under pressure, but quickly recover to their original shape when pressure is removed so the film can be used again.

In a preferred embodiment, the micro-embossed imaging surface topology is chosen so that ink droplets printed onto the micro-embossed surface do not protrude above the tops of the micro-embossed elements thereby improving handling properties of imaged sheet.

Figure 16:
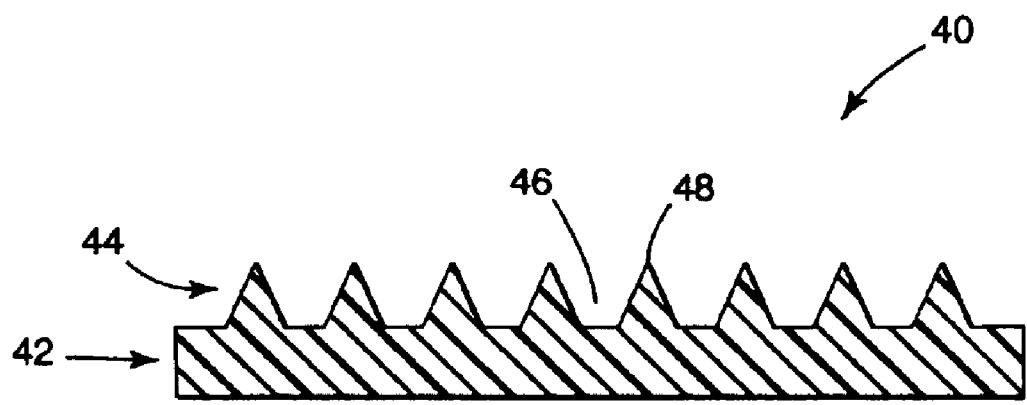

In another image transfer medium, shown in FIG. 16, the image transfer medium 40 is constructed of a sheet 42 having an micro-embossed imaging surface topography 44 of multiple wells or cavities 46 and peaks 48 wherein the micro-embossed or image surface has ink release properties. In this embodiment, the micro-embossed imaging surface itself has ink release properties, that is, the micro-embossed surface has a surface energy that facilitates the transfer of ink from the surface topography without any additional ink release coating added (See FIG. 15). The imaging surface of the sheet is also nonporous as defined above.

Materials having a surface energy in the range of from about 43 dyne/centimeter or less are suitable for use as sheets 42 or as a micro-embossed surface topography 44. Non-limiting examples of materials that provide a suitable surface energy include polymeric materials such as polydimethylsiloxanes, fluorinated polymers, polyolefins (e.g., such as polyethylene, polypropylene, etc.) and polyvinyl chloride. For use with aqueous inks, useful materials have a surface energy of less than about 43 dyne/centimeter, with materials having a surface energy of from about 30 dyne/centimeter or less being preferred. For use with non-aqueous inks (i.e., solvent based or 100 percent solids), materials having a surface energy of from about 30 dyne/centimeter or less are useful, preferably from about 25 dyne/centimeter or less.

Figure 17:
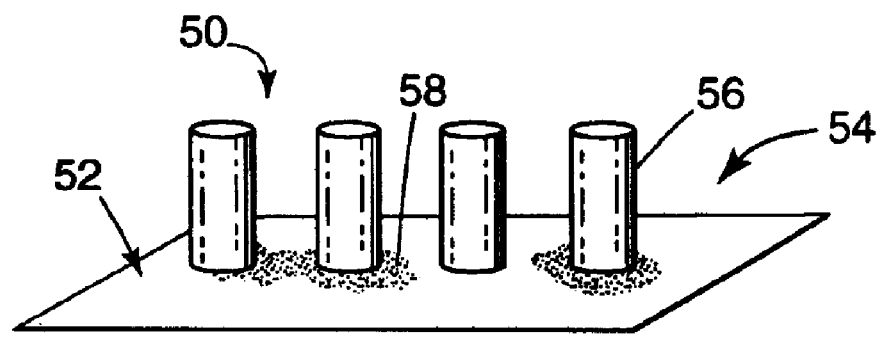

In another image transfer medium, shown in FIG. 17, the image transfer medium 50 is constructed of a sheet 52 having a micro-embossed imaging surface topography 54 of multiple posts 56. The posts may be any protruding geometric shape, for example, circular, oval, trapezoidal, spiral, square, triangular, octagonal, and the like. Preferably, the space between posts is from about 10 to about 1000 micrometers, even more preferably from about 50 to about 800 micrometers and even more preferably from about 200 to about 600 micrometers. Preferably, the height of the posts ranges from about 5 to about 100 micrometers, more preferably from about 10 to about 70 micrometers, even more preferably from about 10 to about 40 micrometers. Preferably, the diameter of the posts ranges from about 10 to about 150 micrometers, more preferably from about 10 to about 100 micrometers and even more preferably from about 30 to about 90 micrometers. Preferably, the density of the posts ranges from about 1 to about 40 posts per square millimeter, more preferably from about 2 to about 20 posts per square millimeter and even more preferably from about 2 to about 10 posts per square millimeter. As shown above sheet 52 may be made from a material that provides an ink release property to the imaging surface. Alternatively, an ink release coating may be coated onto the imaging surface.

Figure 18:
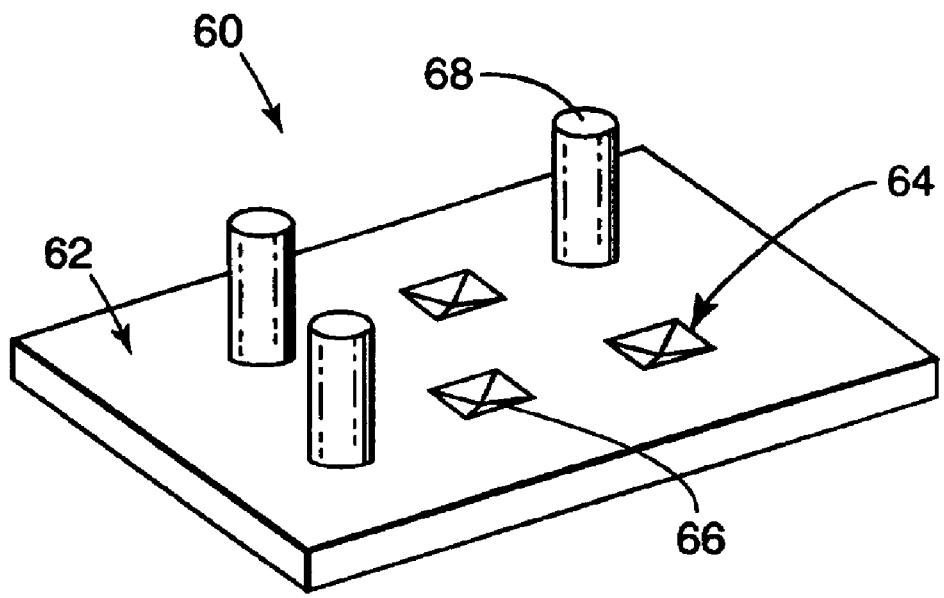

In another image transfer medium shown in FIG. 18, the image transfer medium 60 is constructed of a sheet 62 having a micro-embossed imaging surface topography 64 of wells or cavities 66 and posts 68. The cavities are spaced such that they provide control over the placement of the ink droplets while the posts are spaced to prevent accidental smearing of the wet ink. Preferably, the pitch of the cavities is finer than the pitch of the posts. However, the pitch of the cavities when combined with the posts can typically be wider than the pitch of cavities alone since the posts prevent the wet image from smearing during handling. The posts may also be applied in a random manner to an imaging substrate having cavities such that some of the posts are within a cavity. The height of the posts may or may not exceed the height of the walls of the cavities. As described above, the imaging surface may be constructed of a material that provides an ink release property of the imaging surface may be coated with an ink release coating.

The sheets described in FIGS. 15–18 can be a solid film. The sheets may be transparent or translucent, clear or tinted, or optically transmissive. The sheets 12 and 42 are preferably transparent.

Nonlimiting examples of polymeric films useful as sheets in the image transfer media include thermoplastics such as polyolefins (for example, polyethylene, polypropylene, polybutylene, copolymers of styrene and butadiene, copolymers of ethylene and propylene, etc.); poly(vinyl chloride); hydrolyzed or unhydrolyzed copolymers of ethylene with vinyl acetate; polycarbonates; norbornene copolymers; fluorinated thermoplastics such as copolymers and terpolymers comprising hexafluoropropylene, vinylidene fluoride, tetrafluoroethylene, or vinyl fluoride, and surface modified versions thereof, poly(ethylene terephthalate) and copolymers thereof, polyurethanes, polyimides, acrylics, and filled versions of the above using fillers such as silicates, aluminates, feldspar, talc, calcium carbonate, titanium dioxide, and the like. Also useful in the application are non-wovens, coextruded films, and laminated films made from the materials listed above. A person of ordinary skill in the art can easily measure the surface energy of any of the above films to determine whether the films provide a suitable surface energy for use in an image transfer media described by FIG. 16 and the accompanying text.

More specifically, polyolefins can be ethylene homopolymers or copolymers, such as "7C50" brand ethylene propylene copolymer commercially available from Union Carbide Co. of Houston, Tex. Other specifically useful films include "LEXAN" polycarbonate from General Electric Plastics of Pittsfield, Mass., "ZEONEX" polymer from B. F. Goodrich of Richfield, Ohio, fluoropolymers such as "THV-500" and "THV 250" polymers from Dyneon LLC of Oakdale, Minn., plasticized poly(vinyl chloride), poly(ethylene terephthalate) copolymer "EASTAR" 6763 from Eastman Chemical Co. of Kingsport, Tenn., "AFFINITY" PL 1845 from Dow Chemical Co. of Midland, Mich., and SURLYN™ acrylic acid copolymers from E. I. Du Pont de Nemours and Co. of Wilmington, Del.

In further embodiments of sheets shown in FIGS. 15–18, any sheet suitable for feeding into an inkjet printer may be further coated, laminated, or co-extruded with one or more of the polymers suitable for use in polymeric films of according to the invention and further micro-embossed (and, if necessary, coated with an ink release material as described herein) to provide image transfer media of the invention. Non-limiting examples of such sheets are papers, including for example xerographic grade papers, specialty inkjet papers, and coated papers, etc.; nonwoven materials, including for example spunbond polyolefins, etc.; card stock; envelopes; etc.

Thermoset materials are also additionally useful as materials for sheets or micro-embossed imaging surface topographies that have ink release properties without the use of an ink release coating. For example, reactive silicones (either two-part or moisture curable, UV-curable materials (e.g., acrylate mixtures) may be applied to a micro-embossed roll, cured and removed from the roll to give an micro-embossed film having an inverse image of the roll.

The structure of the micro-embossed surface topography can be any structure that provides cavities that will each hold at least 10 pL of ink. For example, the topographies for the cavities can range from the extreme of cubic cavities with parallel vertical, planar walls, to the extreme of hemispherical cavities, with any possible solid geometrical configuration of walls in between the two extremes. Specific examples include conical cavities with angular, planar walls, truncated pyramid cavities with angular, planar walls, and cube corner shaped cavities. Other useful micro-embossed structures are described in PCT publications WO 00/73082 and WO 00/73083.

The pattern of the topography can be regular, random, or a combination of the two. "Regular" means that the embossing pattern is planned and reproducible regardless of the pattern of the embossing. "Random" means one or more features of the micro-embossed elements are intentionally and/or systematically varied in a non-regular manner. Examples of features that are varied include for example, micro-embossed element pitch, peak-to-valley distance, depth, height, wall angle, edge radius, and the like. Combination patterns may for example comprise patterns that are random over an area having a minimum radius of ten cavity widths from any point, but these random patterns can be reproduced over larger distances within the overall pattern.

More than one drop of ink may be contained in a cavity because the mixing of the colors cyan, yellow, and magenta are required to create the infinite number of colors demanded in the inkjet industry. Thus, the volume of the cavities should be capable of holding as many as three drops of different colors of ink. The volume of a cavity can range from about 1 to about 20,000 pL, preferably from about 1 to about 10,000 pL, more preferably from about 3 to about 1,000 pL, even more preferably from about 30 to about 10,000 pL, and even more preferably from about 300 to about 10,000 pL.

For applications in which desktop inkjet printers (typical drop size of 3–20 pL) will be used to generate the image, cavity volumes of from about 1000 to about 3000 pL are preferred. For applications in which large format desktop inkjet printers (typical drop size of 10–200 pL) will be used to generate the image, cavity volumes of from about 3,000 to about 10,000 pL are preferred.

Another way to characterize the structure of the cavities is to describe the cavities in terms of aspect ratios. An "aspect ratio" is the ratio of the depth to the width of the cavity. Useful aspect ratios range from about 0.01 to about 2, preferably from about 0.05 to about 1, and more preferably from about 0.05 to about 0.3.

The overall depth of the cavities depends on the shape, aspect ratio, and desired volume of the cavities. For a cubic-shaped cavity, the depth ranges from about 5 to about 100 micrometers. For a hemispherical-shaped cavity, the depth ranges from about 7 to about 100 micrometers. The depths of other geometrically shaped cavities reside in between these two extremes for a given volume.

Micro-embossed element pitch of the micro-embossed image transfer media of the invention are in the range of from 1 to about 1000 micrometers, preferably from 10 to about 500 micrometers, more preferably from about 50 to about 400 micrometers. It is recognized that in some embodiments of the invention, it may not be necessary, or desirable, that uniform micro-embossed element pitch be observed between micro-embossed elements, nor that all features be identical. Thus, an assortment of different types of features, for example, cavities or wells with, perhaps, an assortment of micro-embossed element pitches may comprise the micro-embossed surface of the image transfer media according to the invention.

Image transfer media of the invention may be prepared and used in many dimensions. Useful lengths may be from about 1 centimeter up to 2,000 meters or even longer (especially when used in roll form). Useful widths may be from about 0.5 centimeter up to about 250 centimeters or even wider. Useful thicknesses of image transfer media of the invention may range from about 25 micrometers up to 0.5 millimeter or even higher so long as the material may be printed by inkjet means.

The image transfer media of the invention may also optionally have an ink receptive coating on the micro-embossed imaging surface. The ink receptive coating may comprise one or more layers. The purpose of the ink receptive coating is to limit migration of colorant both prior to and after subsequent image transfer. The ink receptive coating may be used on any image transfer media described in this application.

Useful ink receptive coatings are hydrophilic and aqueous ink sorptive. Such coatings include, but are not limited to, polyvinyl pyrrolidone, homopolymers and copolymers and substituted derivatives thereof; vinyl acetate copolymers, for example, copolymers of vinyl pyrrolidone and vinyl acetate, copolymers of vinyl acetate and acrylic acid, and the like, and hydrolyzed derivatives thereof; polyvinyl alcohol, acrylic acid homopolymers and copolymers; co-polyesters such as the VITEL co-polyesters available from Bostick, Middleton, Mass.; acrylamide homopolymers and copolymers; cellulosic polymers; styrene copolymers with allyl alcohol, acrylic acid, and/or maleic acid or esters thereof; alkylene oxide polymers and copolymers; gelatins and modified gelatins; polysaccharides, and the like, as disclosed in U.S. Pat. Nos. 5,766,398; 4,775,594; 5,126,195; and 5,198,306. Vinyl pyrrolidone homopolymers and copolymers are preferred.

Optionally, the ink receptive coatings may also include additives that provide a visual property to the transferred image. Such additives include glitter, glass bubbles, pigments, mica, UV absorbers and stabilizers, etc.

Additionally, the image transfer media of the invention may also have one or more surfactants coated onto the micro-embossed imaging surface. Examples of useful surfactants include those described in U.S. Pat. No. 5,932,355 at column 7, lines 22–31, incorporated by reference in this application.

The transfer medium 10 optionally has an adhesive layer on the major surface of the sheet opposite micro-embossed image surface 12 that is also optionally but preferably protected by a release liner. After imaging, the receptor medium 10 can be adhered to a rigid substrate before image transfer.

The choice of adhesive and release liner depends on usage desired for the image graphic.

Pressure-sensitive adhesives can be any conventional pressure-sensitive adhesive that adheres to both the polymer sheet and to the surface of the item upon which the transfer medium having the precise image is to be placed. Pressure-sensitive adhesives are generally described in Satas, Ed., *Handbook of Pressure Sensitive Adhesives* 2nd Ed. (Von Nostrand Reinhold 1989), the disclosure of which is incorporated by reference. Pressure-sensitive adhesives are commercially available from a number of sources. Particularly preferred are acrylate pressure-sensitive adhesives commercially available from Minnesota Mining and Manufacturing Company, and generally described in U.S. Pat. Nos. 5,141,790; 4,605,592; 5,045,386; and 5,229,207; and EPO Patent Publication EP 0 570 515 B1.

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, fluorinated polymers, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by reference herein and those liners commercially available as POLYSLIK brand liners from Rexam Release of Oakbrook, Ill., and EXHERE brand liners from P.H. Glatfelter Company of Spring Grove, Pa.

Method of Forming Micro-Embossed Image Surface

The micro-embossed imaging surface can be made from any contacting technique such as casting, coating, or compressing techniques. More particularly, micro-embossing can be achieved by at least any of (1) casting a molten thermoplastic using a tool having a pattern, (2) coating of a fluid onto a tool having a pattern, solidifying the fluid, and removing the resulting micro-embossed solid, or (3) passing a thermoplastic film through a nip roll to compress against a tool having that micro-embossed pattern. Desired embossing topography can be formed in tools via any of a number of techniques well-known to those skilled in the art, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

Alternative methods of forming the micro-embossed image surface include thermoplastic extrusion, curable fluid coating methods, and embossing thermoplastic layers which can also be cured.

Other specific examples of useful image transfer media include those described in U.S. Pat. No. 6,153,038.

Depending on the specific formulation and use intended, additional materials may be incorporated into the mordants and/or dispersed hydrophobic materials employed in various aspects of the invention, including adjuvants such as fillers (e.g., glass bubbles, silica, etc.), surfactants, emulsifiers (e.g., water soluble polymers), coating aids, biocides, UV stabilizers, antioxidants, fungicides, optical brighteners, co-solvents (e.g., alcohols, glycols, glycol ethers, etc.), humectants, and the like.

Aspects and advantages of this invention are further illustrated by the following examples, but the particular materials and amounts thereof recited in these examples, as well as other conditions and details, should not be construed to unduly limit this invention.

EXAMPLES

The following materials and abbreviations are used in the examples that follow:

"EPSON STYLUS COLOR" is a trade designation and model for an inkjet printer, available from U S Epson, Inc. of Torrance, Calif.

"HP51626" black and "C1823" series inkjet inks, "DESKJET PLUS" and "DESKJET 855Cse" thermal inkjet printers are available from the Hewlett-Packard Company of San Diego, Calif.

The 100 percent cotton T-shirt cloth used in the examples was HANES SPECIAL-TEE brand, 100 percent combed cotton (white), available from Hanes Companies of Winston Salem, N.C., and had a thickness of 0.203 millimeters and basis weight of 104 g/m².

Mayer Rods (i.e., wire-wound rods) are available from R D Specialties, Inc. of Webster, N.Y. # 6 Mayer Rods give coatings of nominal wet film thickness of 0.014 millimeter.

"FLUORAD FC-359" (an aqueous dispersion of a fluoroalkyl polymer (approximately 20 percent)), "FLUORAD FC-461" (a aqueous dispersion of a fluoroalkyl copolymer (approximately 27 percent), "FLUORAD FC-1355" (an aqueous dispersion of a fluoroalkyl polymer (approximately 15 percent)), and "FLUORAD FC-280" (an aqueous dispersion of a fluoroalkyl polymer (approximately 30 percent)) are trade designations for aqueous fluoropolymer dispersions available from Minnesota Mining and Manufacturing Company of St. Paul, Minn.

"3M FINE GRADE SANDING SPONGE" was obtained from Minnesota Mining and Manufacturing Company.

"ASPEN SELECT GRADE HOBBY WOOD" is a trade designation for aspen wood, which has been sanded smooth for use by hobbyists. It or equivalents may be obtained at hobby and craft stores.

Alumina-HPMC is an aqueous solution (2.5 percent solids) of an aluminum ion-crosslinked hydroxypropyl methylcellulose polymer network impregnated with a colloidal aluminum oxide-hydroxide sol as described in U.S. Pat. No. 5,686,602 using the procedure of Example 1 and the acid of Example 2, incorporated by reference in this application.

"DISPAL 23N4-20" is a 25 weight percent solids aqueous alumina dispersion, available from Vista Chemical Co. of Houston, Tex.

"ERA" is a brand name for laundry detergent, available from Procter and Gamble Co. of Cincinnati. Ohio.

"FREESOFT 970" is a trade designation for a silicone emulsion (20 weight percent solids in water), available from B.F. Goodrich Co. of Akron, Ohio.

"AIRFLEX 465" is an aqueous dispersion of ethylene-vinyl acetate copolymer (approximately 60 weight percent solids), available from Air Products and Chemicals, Inc. of Allentown, Pa.

"NALCO 2326" (a colloidal silica sol, 5 nanometer particle size), "NALCO 2327", (a colloidal silica sol, 20 nanometer particle size), "NALCO 2329", (a colloidal silica sol, 75 nanometer particle size), and "NALCO 1056" (alumina-coated silica, 20 nanometer particle size), are available from Nalco Chemical Co. of Naperville, Ill.

"AEROSIL A130" is a trade designation for dry fumed silica, available from DeGussa Corp. of Ridgefield Park, N.J.

"3M SCOTCHCAL GRAPHIC MARKING FILM" (a trade designation 0.05 millimeter thickness, white polyvinyl chloride film), and "SCOTCH BRAND MAGIC TAPE" (a trade designation for transparent tape) are both available from Minnesota Mining and Manufacturing Company.

Silicone coated LDPE/PET/HDPE (i.e., low density polyethylene/polyethylene terephthalate/high density polyethylene) film surface and polyethylene coated paper each having a thin silicone topcoat on the LDPE surface, are available from Rexam Release.

Aluminum nitrate, aluminum sulfate, and 3-aminopropyltrimethoxysilane are available from general chemical vendors such as from Aldrich Chemical Co. of Milwaukee, Wis.

Micro-Embossed Image Transfer Media

The following microstructured patterns were used in some of the examples, which follow and are referred to as Pattern 1 and Pattern 2. Both patterns were micro-embossed by calendering of a continuous web of the materials to be micro-embossed using a corresponding engraved roll having an inverse image as the roll contacting the micro-embossed side of the web, unless otherwise specified.

Pattern 1 is a "75 LPI" pattern referred to in the examples is an array of square cavities that are 25 micrometers deep and having a micro-embossed element pitch of 332 micrometers and walls that are 9 micrometers thick at their top and 22 micrometers thick at their base.

Pattern 2 is a "130 LPI" pattern of square cavities of 197 micrometers micro-embossed element pitch, cavity depth of 15 micrometers, and included wall angle of 60°. The wall thickness is 20 micrometers at the bottom of the cavity. Additionally, at the center of the bottom of this cavity resides a second cavity that increases the total volume of the structure. This second cavity is pyramid shaped (four sides proceeding to a point at the deepest point of the two-cavity structure). It is 38 micrometers wide at the opening, and is 10 micrometers deep with a 125° included angle of descent.

General Procedure a for Preparing Imaged Articles:

A digitally created image stored on a computer was imaged with an EPSON STYLUS color inkjet printer operating at the 720 dpi, Coated 720×720 Media settings onto piece of 0.1 millimeter polyvinylidene dichloride primed polyethylene terephthalate film coated with a fluorinated release layer (image transfer medium) prepared as described in Comparative Example 1 of U.S. Pat. No. 5,760,126, incorporated by reference herein. This image, while still wet, was transferred onto 100 percent cotton cloth that had been dampened with an aqueous liquid (wet add on of approximately 10 weight percent) by intimately contacting the imaged surface of the image transfer medium with a printable surface of a desired substrate, applying firm hand pressure to the back side of the image transfer medium, and removing the image transfer medium. The resulting wet image was placed in an air convection oven for 5 minutes at 100° C.

Comparative Example 1

This comparative example illustrates the problems associated with imaging cotton cloth using inkjet printer inks.

A 15 centimeter by 15 centimeter piece of cotton cloth was imaged according to General Procedure A using deionized water to dampen the cotton cloth. The imaged cloth was placed into a capped vial of water (30 grams of water). The vial was agitated for a minute to wet the cloth, then left to stand at ambient room temperature for about 24 hours. The water extract showed significant color, due to the dyes leaching out into the solution. A UV-Vis absorption spectrum was taken of the resulting solution, showing several absorption bands, due to the various colors coming out into the solution. The maximum absorption was for the magenta color, which has a visible absorption maximum at 560 nanometers. The optical density (i.e., absorbance) of the solution at 560 nanometers was 1.18. Image quality (i.e., color density and resolution) was badly degraded.

Comparative Example 2

Alumina-HPMC was applied to a cotton cloth with a #6 Mayer Rod and was imaged according to General Procedure A. The imaged cloth was placed into a capped vial of water (30 grams). The vial was agitated for a minute to wet the cloth, then left to stand at ambient room temperature for about 24 hours. The water extract showed less color due to the dyes leaching out into the solution than seen in Comparative Example 1.

The optical density of the solution at 560 nanometers was 0.40. The image quality was much better than was that of Comparative Example 1 before and after soaking in water.

Comparative Example 3

A water-based dispersion of fluoropolymer, FLUORAD FC-359, was applied to a cotton cloth with a # 6 Mayer Rod. An image was applied and the resulting image dried according to General Procedure A.

The imaged cloth was placed into a capped vial of water (30 grams water). The vial was agitated for a minute to wet the cloth, then left to stand at ambient room temperature for about 24 hours. The water extract showed less color due to the dyes leaching out into the solution than seen in Comparative Example 1.

The optical density of the solution at 560 nanometers was 0.68. The overall image was better quality than that of Comparative Example 1, but poorer than the image of Comparative Example 2 after soaking in water.

Comparative Example 4

A 10 percent solution of aluminum nitrate in water was applied to cotton cloth (T-shirt) with a #6 Mayer Rod. This cloth was imaged by General Procedure A. The dried imaged cloth was placed into a vial of water. After some agitation, immediately the solution became colored. The optical density of the solution was greater than 2, with very little image apparent on the cloth.

A repeat of this procedure using aluminum sulfate in place of aluminum nitrate gave the same result.

Example 1

This is an illustrative example of an image fixing treatment according to the invention.

A solution was made of the following ingredients:

| | |
|---|---|
| alumina-HPMC solution | 5 parts by weight |
| FLUORAD FC-359 | 1 part by weight |

The resulting 3 percent (by solids) aqueous solution was mixed well and applied to cotton cloth with a # 6 Mayer Rod. A piece of cotton cloth was coated with the above composition using a # 6 Mayer Rod and was imaged according to General Procedure A. The imaged cloth was placed into a capped vial of water (30 grams of water). The vial was agitated for a minute to wet the cloth, then left to stand at ambient room temperature for about 24 hours. The water extract showed much less color due to the dyes leaching out into the solution than seen in Comparative Example 1.

The optical density of the solution at 560 nanometers was 0.23. The image quality was better than that of the image of Comparative Examples 2 and 3 after soaking in water.

Example 2

These are illustrative examples of image fixing treatments according to the invention.

A number of examples were performed using the same two ingredients as in Example 1 in differing ratios. Examples were carried out as previously described in Example 1, and the images tested for colorfastness as before, except that the coatings were sprayed with a aerosol dispenser (wet add on weight was in the range of 100–140 grams per square meter).

TABLE 1

| Example No. | Alumina-HPMC (Weight Percent) | FLUORAD FC-359 (Weight Percent) | Absorbance at 560 Nanometers of Water Solution |
|---|---|---|---|
| 2a | 95 | 5 | 0.34 |
| 2b | 90 | 10 | 0.32 |
| 2c | 83.3 | 16.7 | 0.23 |
| 2d | 75 | 25 | 0.12 |
| 2e | 50 | 50 | 0.06 |
| 2f | 30 | 70 | 0.38 |

Examples 3a–3d

These are illustrative examples of an image fixing treatment according to the invention.

Weight ratios of 5 parts of alumina-HPMC to 1 part of the fluoropolymer were used. The procedure of Example 2 was repeated using the materials and amounts described in Table 2, and the images tested for colorfastness as before. Results are presented in Table 2.

TABLE 2

| Example No. | Alumina-HPMC (Weight Percent) | Fluorinated Additive (Weight Percent) | Absorbance at 560 Nanometers of Water Solution |
|---|---|---|---|
| Comparative Example 1 | 0 | 0 | 1.18 |
| 3a | 83.3 | FLUORAD FC-359, 16.7 | 0.23 |
| 3b | 83.3 | FLUORAD FC-461, 16.7 | 0.12 |
| 3c | 83.3 | FLUORAD FC-1355, 16.7 | 0.50 |
| 3d | 83.3 | FLUORAD FC-280, 16.7 | 0.26 |

Example 4

These are additional illustrative examples of image fixing treatments according to the invention.

Instead of alumina-HPMC, DISPAL 23N4-20 (a commercially available aqueous alumina dispersion) was used. This was mixed with fluoropolymer, then coated with a # 6 Mayer Rod onto the cloth to dampen the cloth. The composition contained a ratio of 4.7 parts DISPAL 23N4-20 to 1 part of FLUORAD FC-461. An image was applied and the resulting image dried as in General Procedure A. The water soak test of Example 3 was carried out on these samples, with the exception that a 0.1 percent commercial laundry detergent (ERA brand) in water solution was used to test the imaged fabric. The result obtained with this test was an optical density at 560 nanometers of 0.013. Other ratios varying from 10:1 down to 2:1 by weight of DISPAL 23N4-20: FLUORAD FC-461, also gave good image quality after soaking in water for 24 hours.

Example 5

This is an illustrative example of an image fixing treatment according to the invention.

A solution was made with AIRFLEX 465 latex polymer and DISPAL 23N4-20 (each component is 50 percent by weight in the final solution, which is 30 percent solids in water). A cotton cloth was coated with this solution using a #6 Mayer Rod, then subsequently imaged as in Comparative Example 1 while still damp. Detergent resistance was measured as in Example 4. The optical density of the colorant in solution at 560 nanometers was 0.15.

A solution was made containing 3 parts alumina-HPMC to 4 parts of the AIRFLEX 465 (solution is 16 percent by weight). A cotton cloth was coated with this solution using a #6 Mayer Rod, then subsequently imaged as in Comparative Example 1 while still damp. Detergent resistance was measured as in Example 4. The optical density of the colorant in solution at 560 nanometers was 0.21.

Example 6

This example demonstrates the utility of using FLUORAD FC-359 as an aqueous inkjet ink receptive coating for a nonporous polyvinyl chloride film with subsequent heating to provide a water repellent finished print.

A piece of 3M SCOTCHCAL GRAPHIC MARKING FILM was coated with FLUORAD FC-359 at ambient temperature using a #16 Mayer Rod. The coating was subsequently dried at ambient temperature for two hours. After drying, the coated film was printed upon with black ink (HP51626 black inkjet ink), using a DESKJET PLUS inkjet printer operating in standard mode. The test pattern consisted of black text.

After printing, the ink was observed to feel dry to the touch in a few minutes. At this time, the printed substrate was placed in an oven at 100° C. for two minutes. After heating, the substrate was found to be repellent to aqueous and oily fluids. Using the protocol described in the American Association of Textile Chemists and Colorists (AATCC) Standard Test Method No. 118-1983, which is a test based on the resistance of a fabric to penetration by oils of varying surface tensions, a static oil repellency rating of 7 (i.e., excellent) was obtained. Oils and their associated rating numbers are shown in Table 3 below.

TABLE 3

| AATCC Oil Repellency Rating Number | Oil |
|---|---|
| 1 | mineral oil |
| C | 85:15 mineral oil:n-hexadecane |
| 2 | 65:35 mineral oil:n-hexadecane |
| 3 | n-hexadecane |
| 4 | n-tetradecane |
| 5 | n-dodecane |
| 6 | n-decane |
| 7 | n-octane |
| 8 | n-heptane |

Using the same static repellency test, but substituting water, isopropanol, and mixtures thereof, aqueous repellency ratings were determined as shown in Table 4. After soaking in water minutes, partial release of the ink was observed. The source of the weakening of the coating appeared to be at the edges, where encroachment of water could be seen after several minutes.

TABLE 4

| Aqueous Repellency Rating Number | Liquid |
|---|---|
| 0 | water |
| 1 | 90 parts water/10 parts isopropanol (wt/wt) |
| 2 | 80 parts water/20 parts isopropanol (wt/wt) |
| 3 | 70 parts water/30 parts isopropanol (wt/wt) |
| 4 | 60 parts water/40 parts isopropanol (wt/wt) |
| 5 | 50 parts water/50 parts isopropanol (wt/wt) |
| 6 | 40 parts water/60 parts isopropanol (wt/wt) |
| 7 | 30 parts water/70 parts isopropanol (wt/wt) |
| 8 | 20 parts water/80 parts isopropanol (wt/wt) |
| 9 | 10 parts water/90 parts isopropanol (wt/wt) |
| 10 | isopropanol |

When transparent tape (SCOTCH BRAND MAGIC TAPE) was manually applied with pressure against the printed side of the substrate, no adhesion was observed. Also, the coating appeared to adhere well to the substrate as fingernail scratching did not remove the coating of the printed characters.

Preparations of Compositions 1a–1e

This example shows the improvement in image fixing ability achieved by blending cationically functionalized inorganic particulates with fluorocarbon materials.

NALCO 2327, and NALCO 2329 colloidal silica sols were amine-functionalized on their surface by reaction with 3-aminopropyltrimethoxysilane as follows:

Each collidal silica sol was diluted as necessary to achieve 5–10 percent solids by weight and the pH was reduced to 3.5–4 by addition of a suitable amount of concentrated acetic or sulfuric acid. An amount of 3-aminopropyltrimethoxysilane (hereinafter denoted as APTMS) was added to a separate aliquot of water; and the pH was adjusted to match that of the dispersion before its addition to the dispersion with good mixing; the mixture was then stirred and heated to 50° C.–90° C. for 16 hours. The amount of APTMS added, which is shown in the Table 5, was based on the theoretical surface area of the colloid.

TABLE 5

| Composition | Silica | APTMS (millimoles/gram $SiO_2$) |
|---|---|---|
| 1a (comparative) | NALCO 1056 (diluted to 5–10 percent solids at pH = 4 | 0 |
| 1b | NALCO 2326 | 1.5 |
| 1c | NALCO 2327 | 0.9 |
| 1d | NALCO 2329 | 0.35 |

Fumed silica (AEROSIL A130) was also reacted with APTMS in the following manner:

AEROSIL A130 was dispersed in toluene at 3 percent solids, and a theoretical excess of APTMS (1.4 gram APTMS per gram $SiO_2$) added to the dispersion. The mixture was refluxed for 16 hours. The silica was filtered away from the solvent and washed two times with methanol, followed by refluxing in methanol for at least 24 hours before a final filtration and drying of the solids in vacuo. Coating samples were made from this material by simple dispersion of the silica in water at pH of about 4 (referred to hereinafter as Composition 1e).

Samples for printing, printing operations, and analysis of the prints were generated as described in Example 6 above. In each case, an admixture of the coating components in water was blended immediately before coating.

Compositions 1a and 1c–1e were blended, respectively, with FLUORAD FC-359 in ratios shown in the table below. Each of these admixtures was coated onto the PVC substrate as used in Example 6, with a #16 Mayer Rod. Drying was accomplished over 2 hours at ambient temperature, at which the film was printed and heated in an oven at 100° C. for two minutes. Imaging behavior, appearance and repellency of the substrate after printing and heating is compared in Table 6.

TABLE 6

| Inorganic Component | Blend Ratio of Inorganic:FC-359 | Printed Image Properties | Appearance After Heating | AATCC Oil Repellency Rating Number | Aqueous Repellency Rating Number |
|---|---|---|---|---|---|
| Composition 1b | 1:1 | Dry in 2–3 min. Good image resolution | Glossy, smooth | 7 | 10 |
| Composition 1c | 1:1 | Dry in 2–3 min. Good image resolution | Glossy, smooth, slight yellowing | 7 | 10 |
| Composition 1a | 1:1 | Ink beaded up; poor drying, poor image quality | Glossy, smooth, slight yellowing | not measured | 0 |
| Composition 1a | 5:1 | Better ink wetting but ink bled, dry time was poor | Glossy, smooth | not measured | 0 |
| Composition 1d | 2:1 | Dry in 2–3 min. Good image resolution | Glossy, smooth | 7 | 10 |
| Composition 1e | 1:1 | Good drying, resolution; ink was faded in appearance | Chalky, matte appearance | not measured | 0 |

The following examples show the effectiveness of fixing agents of the invention when used with inkjet printing onto cotton fabric.

Example 7

Figure 2:
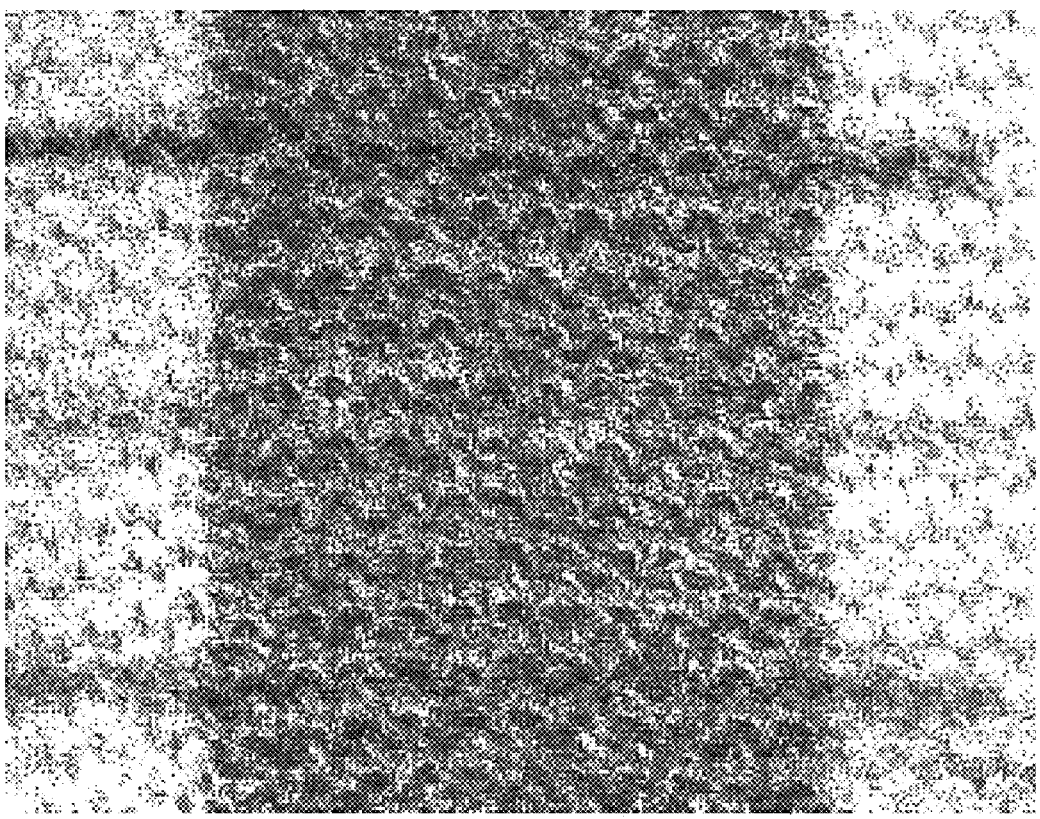

A blend of 95 parts DISPAL 23N4-20 and 5 parts FREESOFT 970 was prepared and adjusted with deionized water to 20 weight percent solids. A sample of cotton material (T-shirt type) was sprayed with this blend (100 weight percent wet add on). The treated fabric was imaged by General Procedure A, except that the drying was done at 65° C. for 15 minutes, and the printer used was an DESKJET 855Cse (presentation quality/glossy paper settings) thermal inkjet printer. The image was allowed to dry at ambient room temperature for 24 hours before a micrograph was taken. Results are shown as magnified digital images designated FIGS. 1 and 2.

Comparative Example 5

Figure 3:
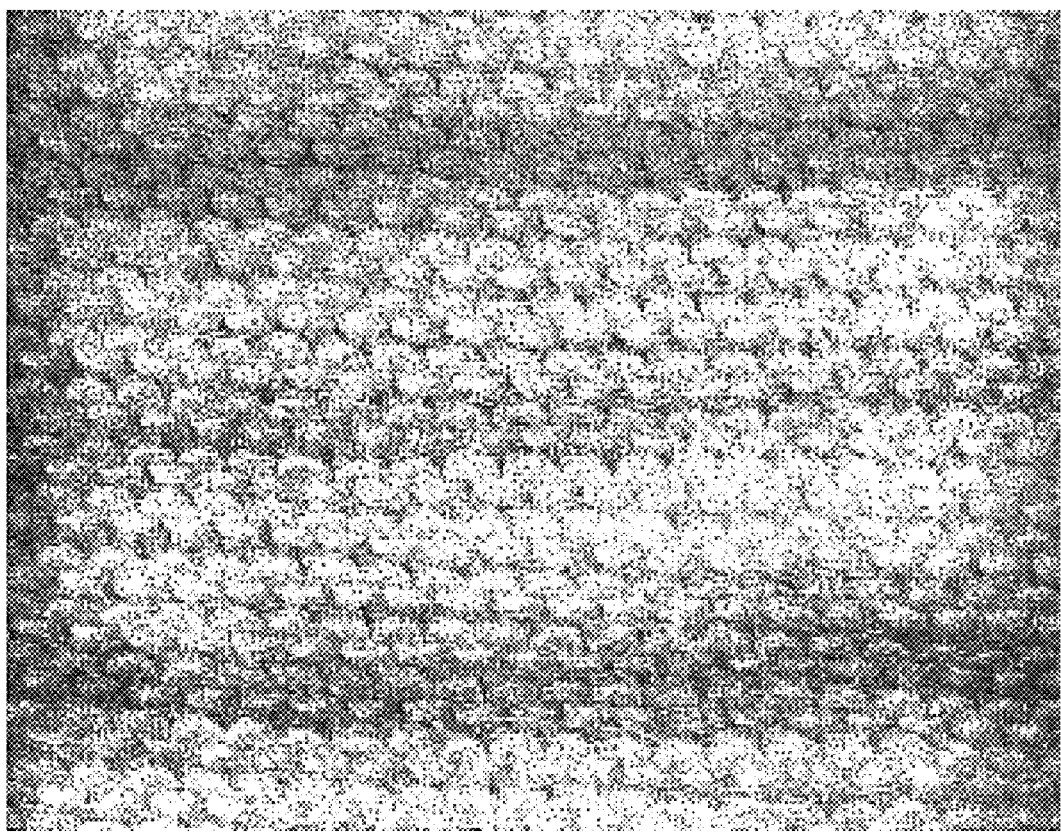
Figure 4:
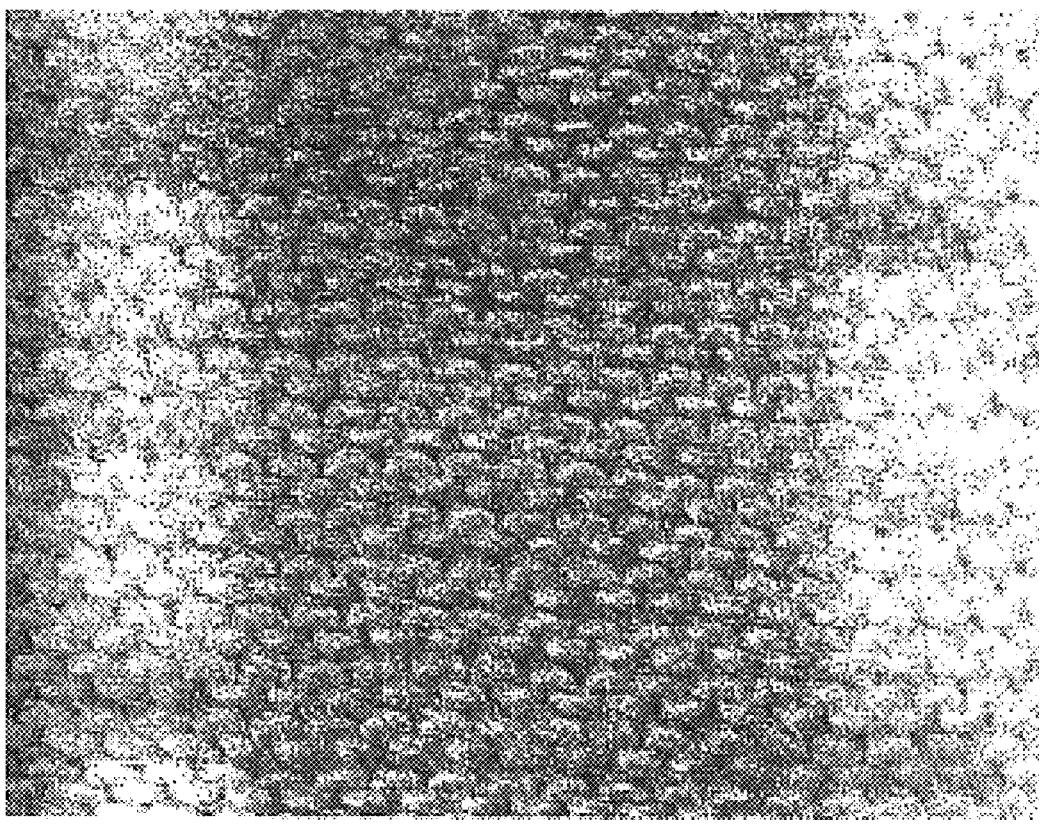

Comparative Example 5 was a sample of cotton material (T-shirt type) sprayed with water (100 weight percent wet add on) and imaged according to Example 7. The image was allowed to dry at ambient room temperature for 24 hours before a micrograph was taken. Results are shown as magnified digital images designated FIGS. 3 and 4.

Examples 8a–8f

Blends of the DISPAL 23N4-20 sol were made with FREESOFT 970 and adjusted to 20 weight percent solids with deionized water, then sprayed onto cotton T-shirt cloth. The treated fabric was imaged as in Example 7.

The imaged cloths were immersed in a 0.1 percent ERA detergent solution for 24 hours. Optical density at 565 nanometers of the detergent solution (a measure of dye wash out) was measured.

TABLE 7

| Example No. | DISPAL 23N4-20/ FREESOFT 970 (Weight/Weight) | Wet add on (Weight Percent) | Absorbance at 565 Nanometers |
|---|---|---|---|
| 8a | 95:5 | 100 | 0.19 |
| 8b | 90:10 | 100 | 0.12 |
| 8c | 90:10 | 50 | 0.46 |
| 8d | 90:10 | 200 | 0.06 |
| 8e | 80:20 | 100 | 0.17 |
| 8f | 60:40 | 100 | 0.1 |

Example 8b was repeated, with the imaged cloth allowed to dry at ambient room temperature (22° C.) for 24 hours, rather than the above drying conditions. The same soak test gave a final result of 0.05 as the optical density at 565 nanometers.

Examples 9a and 9b

This example demonstrates utility of the invention for printing wooden substrates. ASPEN SELECT GRADE HOBBY WOOD was sanded with a 3M FINE GRADE SANDING SPONGE before addition of fixing agent. The fixing agent used was a combination of 95 weight percent DISPAL 23N4-20 and 5 weight percent FREESOFT 970 and diluted with water. The aqueous mixture (20 percent total solids) was sprayed onto one side of the wood to give an average wet coating weight of 50 g/m$^2$.

Figure 5:
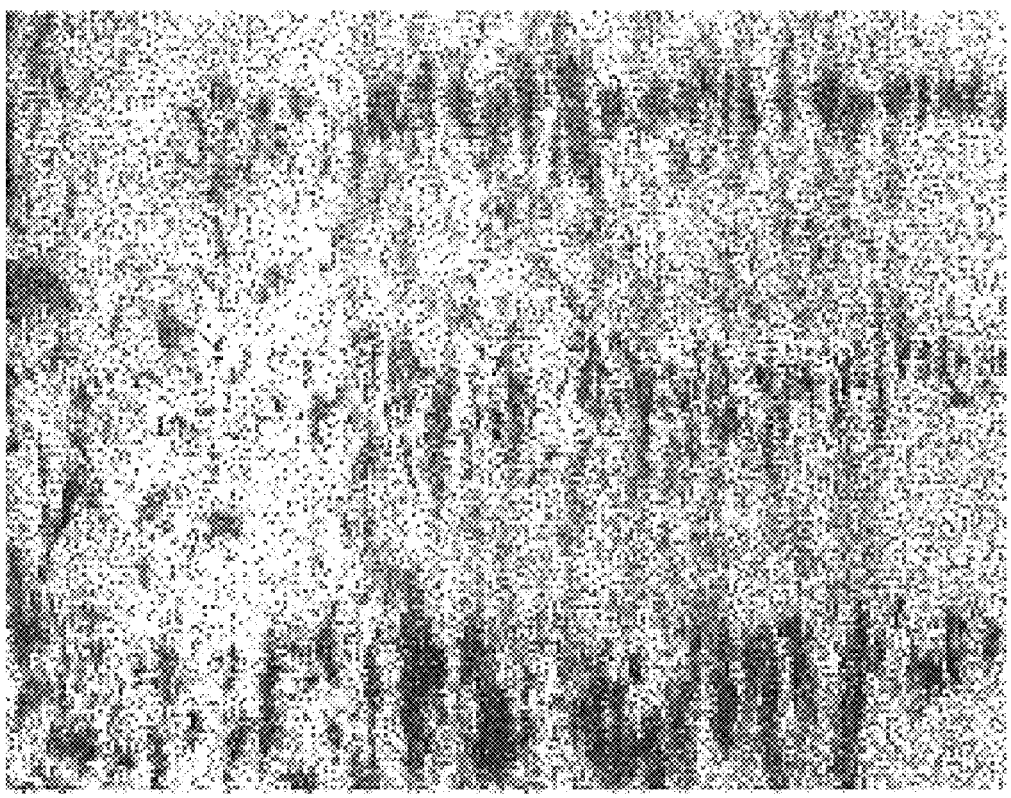

A test pattern consisting of adjacent colored blocks of cyan, magenta, yellow, black, red, green, and blue along with narrow lines of these colors crossing color bars were printed onto a polyethylene coated paper having silicone topcoat using a Hewlett-Packard DESKJET 855Cse thermal inkjet printer in presentation quality/glossy paper mode. The inked side of the image transfer medium was subsequently placed in intimate contact with the treated aspen prepared above, and sufficient pressure applied to cause transfer of the image to the wood (Example 9a) as shown in magnified digital image designated FIG. 5.

Figure 6:
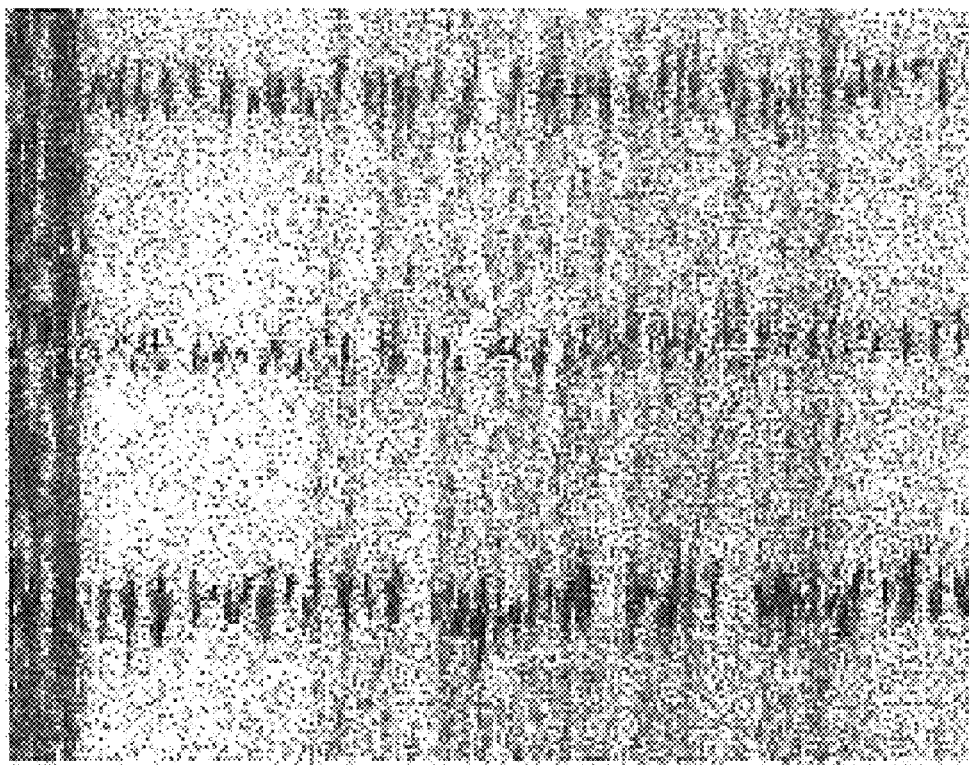

A second transfer was carried out in the same manner except that the image transfer medium further comprised a micro-embossed topography (Pattern 1) on the surface of the polyethylene coated paper having a silicone topcoat as shown in magnified digital image designated FIG. 6.

The resulting transferred images clearly showed differences in resolution attributable to the presence or absence of micro-embossed topography used to affect the transfer of ink to the wood surface. As can be seen in magnified digital images, FIGS. 5 and 6, the transferred image from the smooth film is prone to show where the ink beaded up, ran together in an uncontrolled fashion, and/or smeared before or during transfer. By comparison, the image transferred by the film having a micro-embossed topography has good resolution and ink placement.

Machine Wash Test Procedure

Imaged cloth samples were combined with 1.9 kg of cotton fabric sheets and placed into a SEARS AUTOMATIC WASHER (1996 Model obtained from Sears & Roebuck Co. of Chicago, Ill.). WISK ULTRA detergent (35 grams available from Unilever United States, Inc. of New York, N.Y.) was added to the combined load and the normal wash mode cycle was initiated (41+/−2° C., 12 minute cycle).

The washed samples were dried together with the ballast load in a SEARS TUMBLE CLOTHES DRYER (1996 Model year, obtained from Sears & Roebuck Co.) using the medium heat cycle setting (65+/−5° C. for a duration of 45 minutes.

Comparative Examples 6–8 and Example 10

These examples demonstrate the advantage of using image fixing agents according to the present invention.

Cotton T-shirt cloth (Hanes Special-Tee brand) was cut into test patches of approximately 22 centimeters by 14 centimeters and sprayed with aqueous treatments at 100 percent wet add on by weight (i.e., the wet article weight was twice that of the original dry weight).

The coated cotton test patches of Comparative Examples 6–8 and Example 10 below were imaged as follows: a polyethylene coated paper having a silicone topcoat micro-embossed with Pattern 1 was printed using an DESKJET 855Cse thermal inkjet printer (presentation quality/HP glossy paper settings) with a test pattern containing both solid blocks of color and lines of color through color bars. The inked sheet was immediately applied to the damp fabric with moderate hand pressure for about 1 minute, such that the ink transferred to the fabric. Each fabric sample was placed in a 65° C. oven for 15 minutes, then allowed to stand overnight before taking measurements of reflectance optical densities. FIGS. 7–10 are magnified digital images corresponding to heat treated unwashed cloths from Comparative Examples 6–8 and Example 10, respectively.

The samples were then washed according to the Machine Wash Test Procedure. FIGS. 11–14 are magnified digital images corresponding to washed and dried cloths from Comparative Examples 6–8 and Example 10, respectively. The areas of the cloths shown in FIGS. 11–14 correspond to the same regions shown in FIGS. 7–10, respectively.

Comparative Example 6

Figure 7:
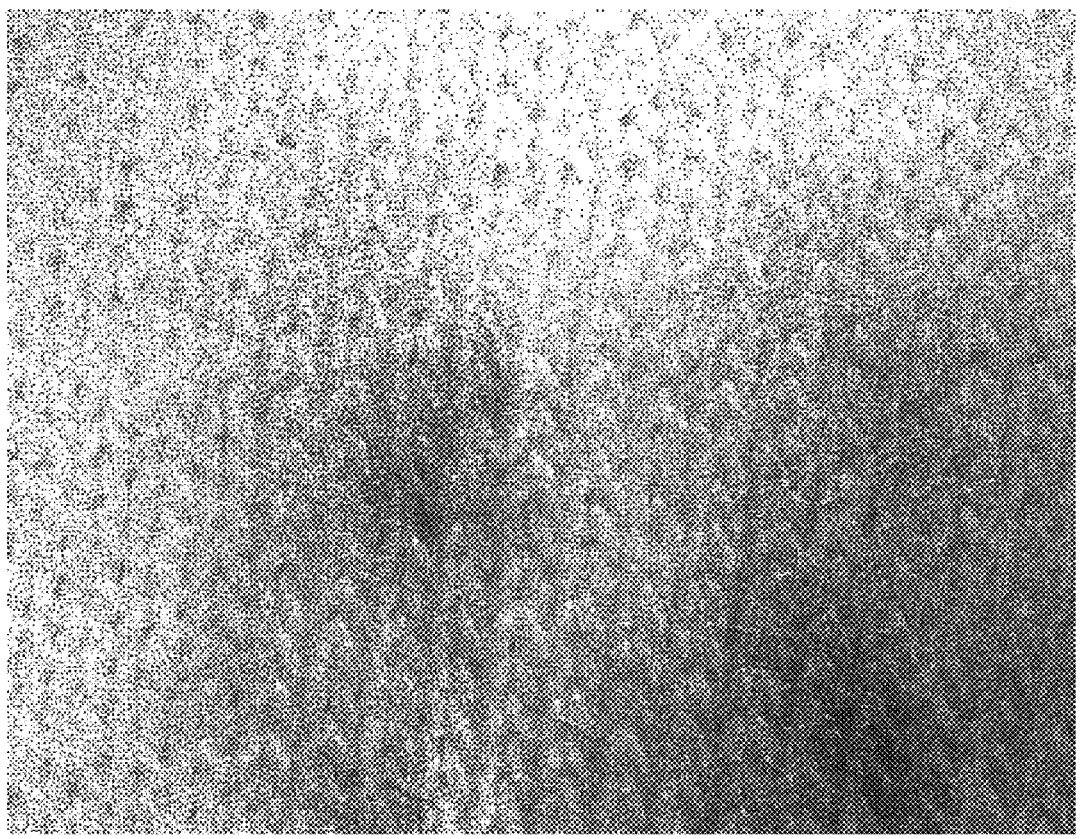
Figure 11:
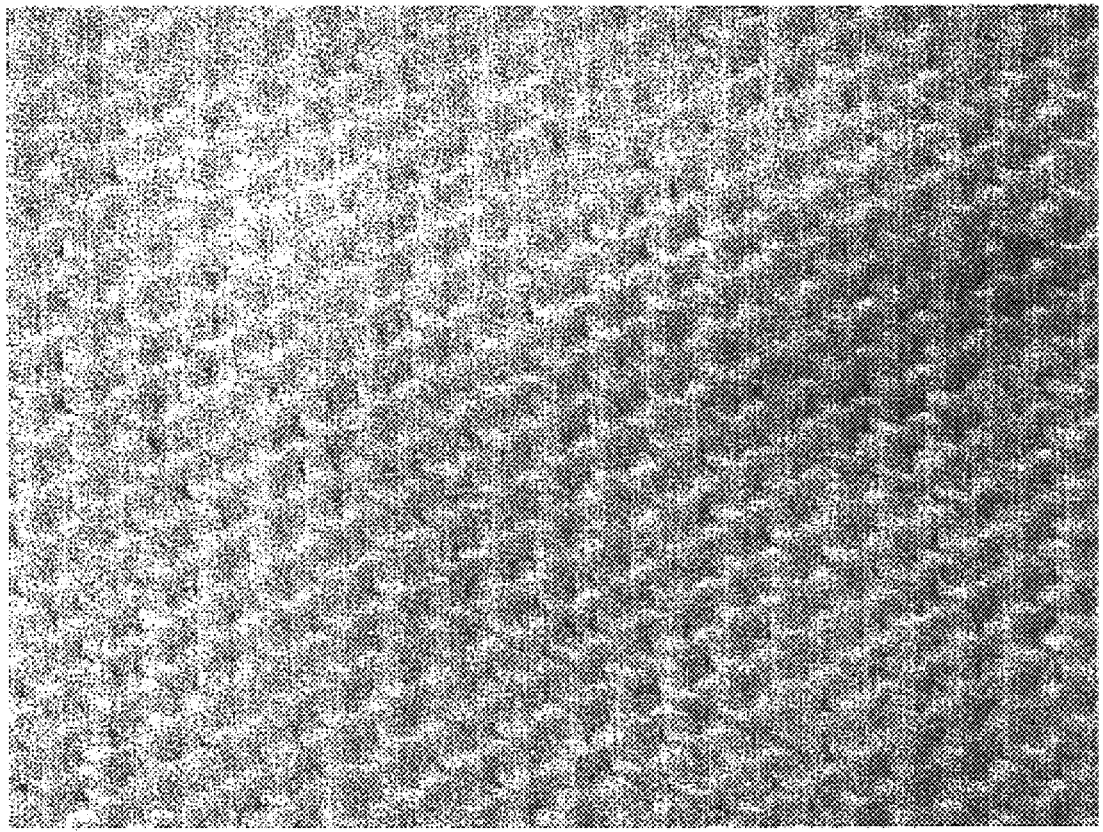

Water was sprayed onto a cotton test patch at 100 percent wet add on by weight. FIG. 7 shows a magnified digital image of the resultant image after image transfer. FIG. 11 shows a magnified digital image of the cloth after machine wash. Reflectance optical density measurements for the imaged samples prior to the Machine Wash Test Procedure and after the Machine Wash Test Procedure were:

|  | Black | Magenta | Cyan | Yellow |
| --- | --- | --- | --- | --- |
| Before machine wash test | 0.99 | 1.16 | 1.11 | 0.86 |
| After machine wash test | 0.57 | 0.80 | 0.67 | 0.02 |

Comparative Example 7

Figure 8:
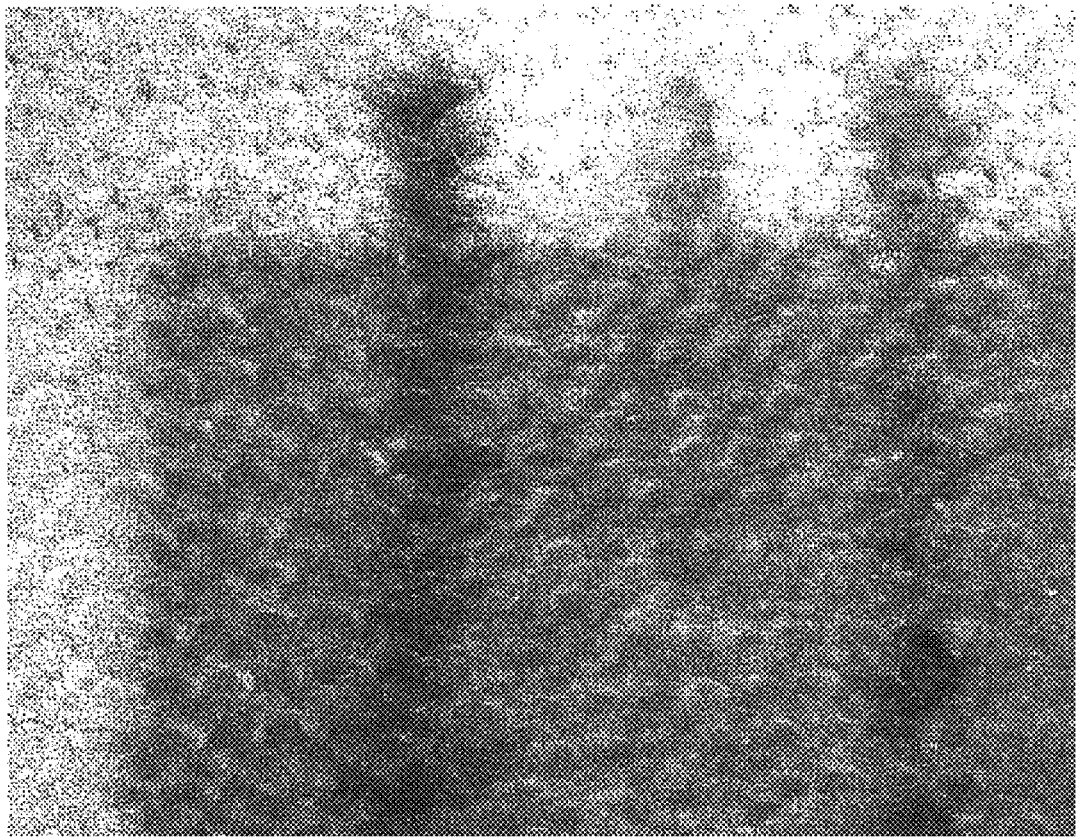
Figure 12:
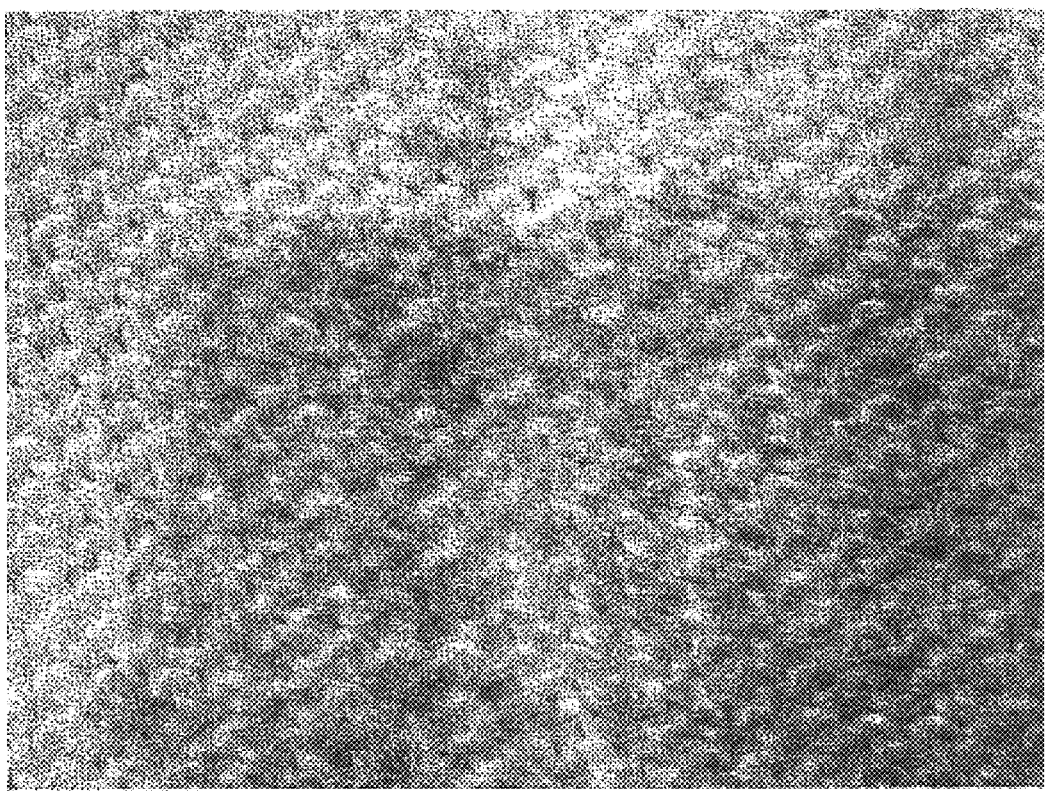

A solution of DISPAL 23N4-20 alumina sol (20 percent solids in water) was sprayed onto a cotton test patch at 100 percent wet add on by weight. FIG. 8 shows a magnified digital image of the resultant image after image transfer. FIG. 12 shows a magnified digital image of the cloth after machine wash. Reflectance optical density measurements for the imaged samples prior to the Machine Wash Test Procedure and after the Machine Wash Test Procedure were:

|  | Black | Magenta | Cyan | Yellow |
| --- | --- | --- | --- | --- |
| Before machine wash test | 0.68 | 1.19 | 1.19 | 0.91 |
| After machine wash test | 0.49 | 0.48 | 0.65 | 0.05 |

Comparative Example 8

Figure 9:
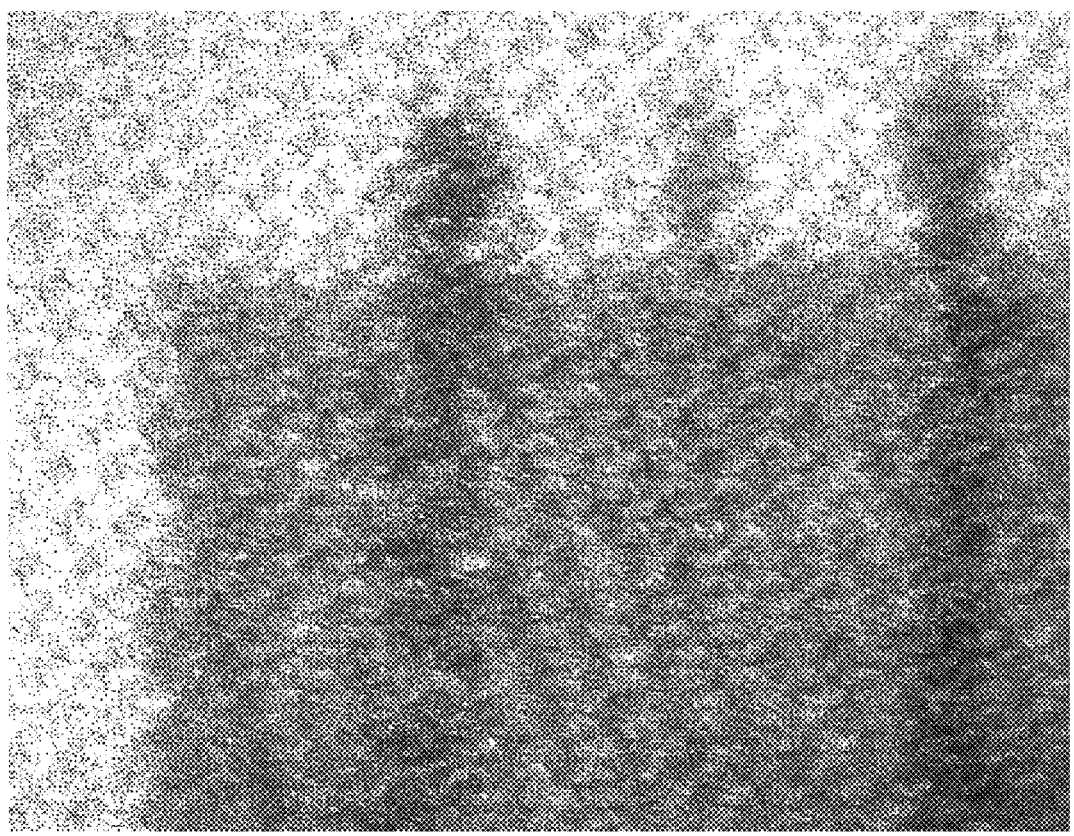
Figure 13:
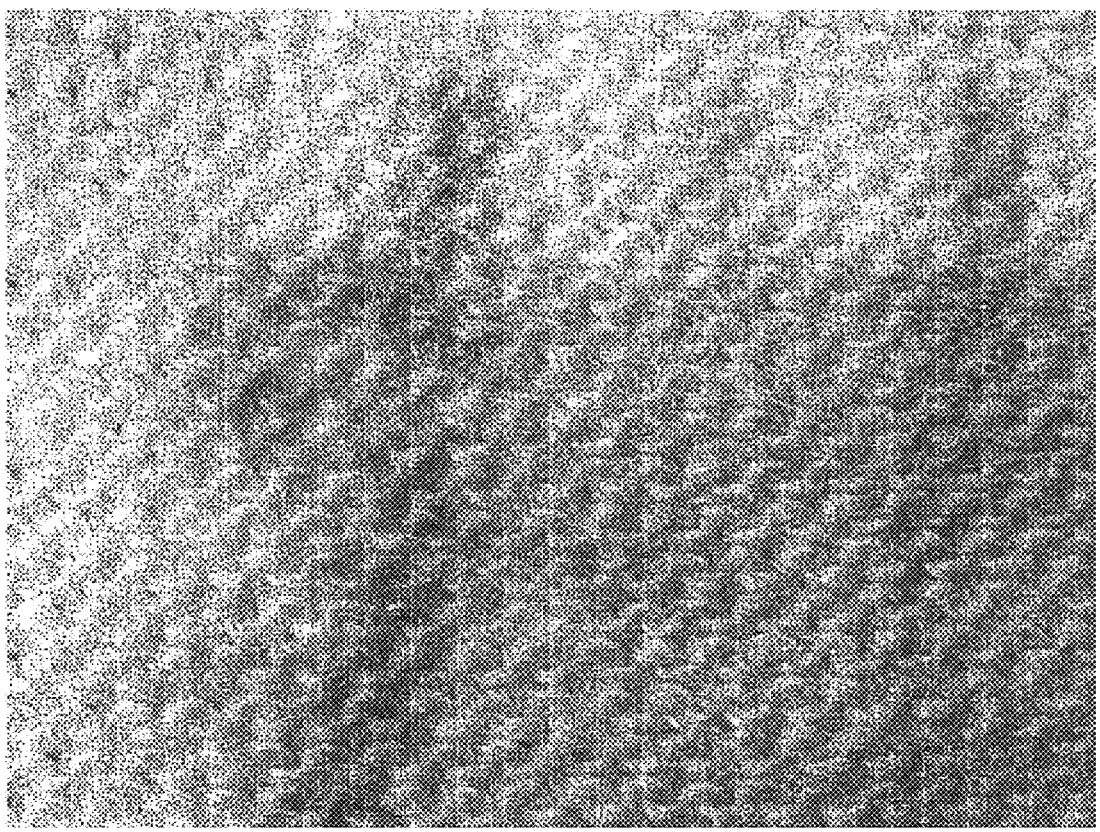

FREESOFT 970 silicone emulsion (20 percent solids in water) was sprayed onto a cotton test patch at 100 percent wet add on by weight. FIG. 9 shows a magnified digital image of the resultant image after image transfer. FIG. 13 shows a magnified digital image of the cloth after machine wash. Reflectance optical density measurements for the imaged samples prior to the Machine Wash Test Procedure and after the Machine Wash Test Procedure were:

|  | Black | Magenta | Cyan | Yellow |
| --- | --- | --- | --- | --- |
| Before machine wash test | 0.94 | 1.25 | 1.23 | 1.12 |
| After machine wash test | 0.86 | 0.81 | 0.75 | 0.17 |

Example 10

Figure 10:
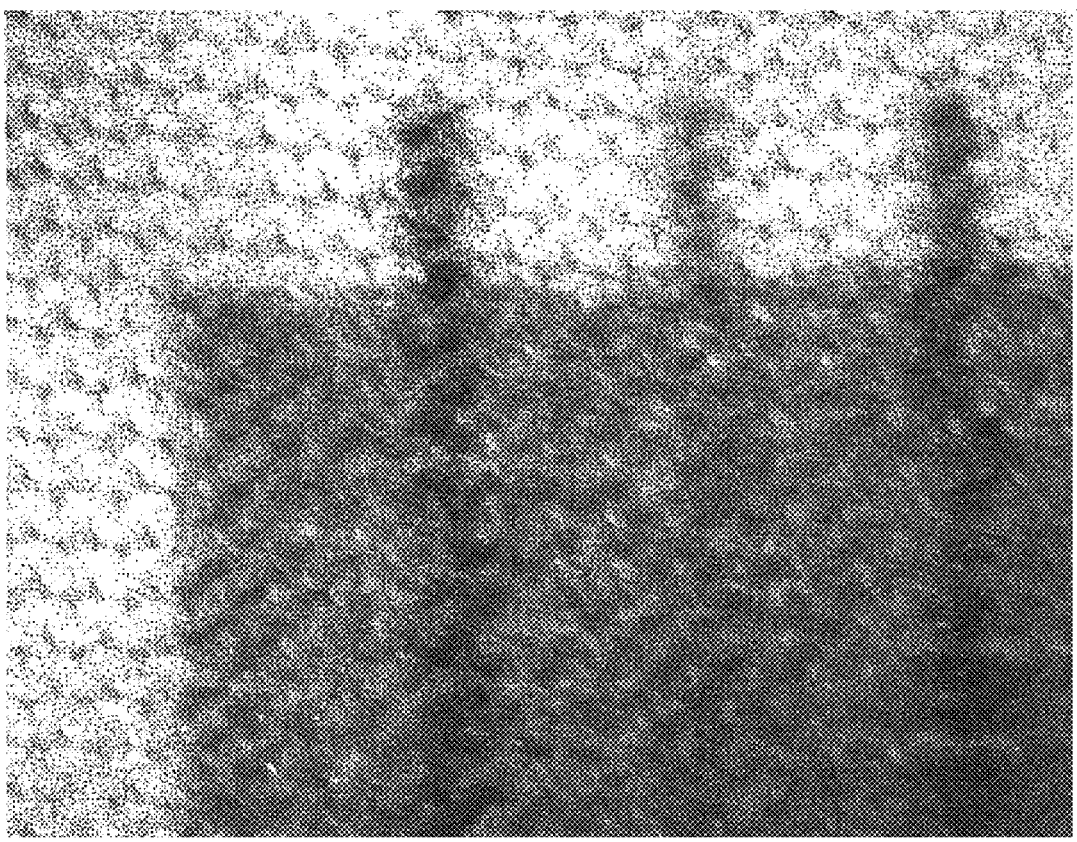
Figure 14:
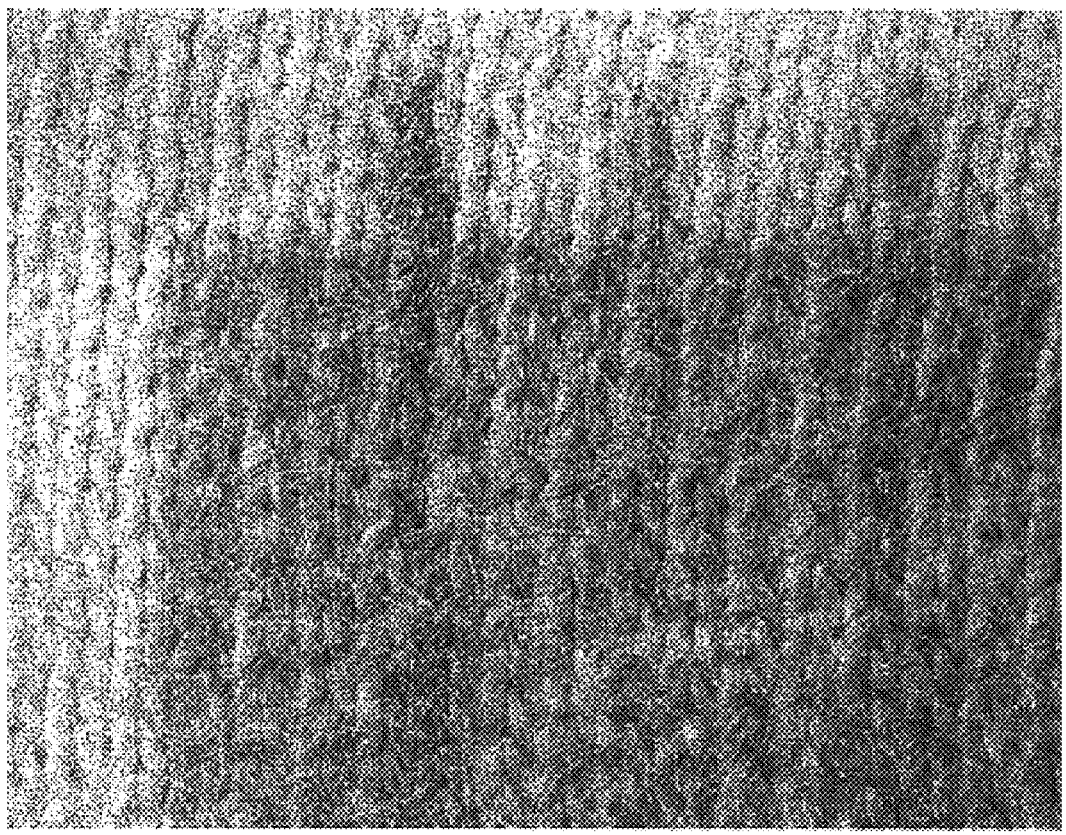

A composition of 80 percent by weight of a solution of DISPAL 23N4-20 alumina sol (20 percent solids in water) and 20 percent by weight FREESOFT 970 silicone emulsion (20 percent solids in water) was sprayed onto a cotton test patch at 100 percent wet add on by weight. FIG. 10 shows the resultant magnified digital image after image transfer. FIG. 14 shows a magnified digital image of the cloth after machine wash. Reflectance optical density measurements for the imaged samples prior to the Machine Wash Test Procedure and after the Machine Wash Test Procedure were:

|  | Black | Magenta | Cyan | Yellow |
|---|---|---|---|---|
| Before machine wash test | 0.78 | 1.26 | 1.16 | 1.01 |
| After machine wash test | 0.56 | 0.55 | 0.71 | 0.20 |

Example 11

A piece of ASPEN SELECT GRADE HOBBY WOOD was prepared as described in Example 9. A 25 weight percent solids dispersion of DISPAL 23N4-20 was sprayed onto a surface of the wood with a wet coating weight of 51 g/m². The coated wood was then dried at a temperature of 80° C. for 2 minutes. An image was printed onto a Pattern 2 micro-embossed silicone coated LDPE/PET/HDPE film using a DESKJET 855Cse (presentation quality/HP glossy paper settings) thermal inkjet printer. The image was transferred to this article as described in Example 10. The resulting imaged article was placed in an 80° C. oven for 2 minutes. A 21 weight percent solids dispersion of FREE-SOFT 970 was sprayed over the image at a coating weight of 60 g/m². The article was then dried for 10 minutes at 80° C.

The resulting image was bright and showed good resolution. Application of water from a deionized water bottle did not wash the image off. Soaking the image in water for 72 hours resulted in a minor loss of color density.

What is claimed is:

1. A method of providing a durable image on a substrate comprising the steps of:
    coating a surface of the substrate with an aqueous mordant dispersion;
    printing or transferring a selected image onto the coated surface;
    optionally drying the image;
    applying a dispersed hydrophobic material onto the image; and
    drying the dispersed hydrophobic material.

2. The method of claim 1 further comprising the step of heating the substrate above ambient temperature after the step of drying the dispersed hydrophobic material.

3. The method of claim 2 wherein the substrate is heated until the dried hydrophobic material becomes hydrophobic.

4. The method of claim 1 wherein the aqueous mordant dispersion is selected from aqueous dispersions of mordants selected from the group consisting of polymeric dye mordants, inorganic metal containing colloids, polymer bound metal ion containing colloids, and combinations thereof.

5. The method of claim 1 wherein the selected image is transferred onto the coated surface.

6. The method of claim 5 wherein the image is transferred using a micro-embossed image transfer medium.

7. The method of claim 1 wherein the dispersed hydrophobic material is selected from dispersions of hydrophobic materials selected from the group consisting of fluoropolymers, silicones, polyvinyls, polyesters, polyurethanes, and combinations thereof.

8. The method of claim 1 wherein the aqueous mordant dispersion is dried prior to printing or transferring the image.

9. The method of claim 8 wherein the aqueous mordant dispersion is dried at a temperature of 100° C. or less.

10. The method of claim 8 wherein the aqueous mordant dispersion is dried at ambient temperature.

11. The method of claim 1 wherein the dispersed hydrophobic material is dried at a temperature of 100° C. or less.

12. The method of claim 1 wherein the dispersed hydrophobic material is dried at ambient temperature.

13. The method of claim 1 wherein the image is dried at a temperature of 100° C. or less.

14. A method of providing a durable image on a substrate comprising the steps of:
    coating a surface of the substrate with a mixture comprising an aqueous dispersion of a mordant and a dispersed hydrophobic material;
    printing or transferring an image onto the coated substrate; and
    drying the image and the coated mixture of dispersed mordant and hydrophobic material.

15. The method of claim 14 further comprising the step of heating the substrate above ambient temperature.

16. The method of claim 14 wherein the image is transferred using an image transfer medium.

17. The method of claim 16 wherein the image transfer medium is a micro-embossed image transfer medium.

18. The method of claim 14 wherein the image and said coated mixture is dried at a temperature of 100° C. or less.

19. The method of claim 14 wherein the image and said coated mixture is dried at ambient temperature.

20. The method of claim 14 wherein the aqueous mordant dispersion is selected from aqueous dispersions of mordants selected from the group consisting of polymeric dye mordants, inorganic metal containing colloids, polymer bound metal ion containing colloids, and combinations thereof.

21. The method of claim 14 wherein the dispersed hydrophobic material is selected from dispersions of hydrophobic materials selected from the group consisting of fluoropolymers, silicones, polyvinyls, polyesters, polyurethanes, and combinations thereof.

* * * * *

UNITED STATES PATENT AND TRADEMARK OFFICE
CERTIFICATE OF CORRECTION

PATENT NO.         : 7,005,162 B2
APPLICATION NO. : 10/865413
DATED                 : February 28, 2006
INVENTOR(S)       : Lori P. Engle It is certified that error appears in the above-identified patent and that said Letters Patent is hereby corrected as shown below:

Column 1,
Line 29, delete "ink-jet" and insert in place thereof -- inkjet --.

Column 7,
Line 26, delete "SLWET" and insert in place thereof -- SILWET --.

Column 13,
Line 33, delete "Cincinnati." and insert in place thereof -- Cincinnati, --.

Column 14,
Line 21, delete "a for" and insert in place thereof -- A For --.

Column 17,
Line 64, after "water" insert -- for 15 --.

Column 18,
Line 28, after "coating" delete "of" and insert in place thereof -- or --.
Line 30, delete "Preparations" and insert in place thereof -- Preparation --.
Line 34, insert -- NALCO 2326, -- before "NALCO 2327".
Line 37, delete "collidal" and insert in place thereof -- colloidal --.

Column 23,
Line 34, delete "aminor" and insert in place thereof -- a minor --.

Signed and Sealed this

Sixth Day of March, 2007

JON W. DUDAS
*Director of the United States Patent and Trademark Office*